United States Patent
Murata et al.

(10) Patent No.: US 7,613,601 B2
(45) Date of Patent: Nov. 3, 2009

(54) METHOD FOR PREDICTING NEGATIVE EXAMPLE, SYSTEM FOR DETECTING INCORRECT WORDING USING NEGATIVE EXAMPLE PREDICTION

(75) Inventors: Masaki Murata, Koganei (JP); Hitoshi Isahara, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 596 days.

(21) Appl. No.: 10/187,785

(22) Filed: Jul. 3, 2002

(65) Prior Publication Data
US 2003/0120481 A1    Jun. 26, 2003

(30) Foreign Application Priority Data
Dec. 26, 2001 (JP) ............... 2001-393734
Dec. 26, 2001 (JP) ............... 2001-394112

(51) Int. Cl.
*G06F 17/27* (2006.01)
*G06N 3/08* (2006.01)
*G06F 7/00* (2006.01)

(52) U.S. Cl. ............... 704/9; 706/25; 707/7
(58) Field of Classification Search ............... 704/9, 704/243, 251, 257; 715/533; 707/5, 7; 706/25
See application file for complete search history.

(56) References Cited

U.S. PATENT DOCUMENTS

| | | | | |
|---|---|---|---|---|
| 5,189,610 A * | 2/1993 | Kaplan et al. | ............... | 704/10 |
| 5,258,909 A * | 11/1993 | Damerau et al. | ............... | 715/533 |
| 5,799,269 A * | 8/1998 | Schabes et al. | ............... | 704/9 |
| 5,952,942 A * | 9/1999 | Balakrishnan et al. | ............... | 341/20 |
| 6,006,183 A * | 12/1999 | Lai et al. | ............... | 704/235 |
| 6,006,221 A * | 12/1999 | Liddy et al. | ............... | 707/5 |
| 6,078,885 A * | 6/2000 | Beutnagel | ............... | 704/258 |
| 6,131,102 A * | 10/2000 | Potter | ............... | 715/533 |
| 6,182,039 B1 * | 1/2001 | Rigazio et al. | ............... | 704/257 |
| 6,208,964 B1 * | 3/2001 | Sabourin | ............... | 704/244 |
| 6,272,462 B1 * | 8/2001 | Nguyen et al. | ............... | 704/244 |
| 6,374,210 B1 * | 4/2002 | Chu | ............... | 704/9 |
| 6,848,080 B1 * | 1/2005 | Lee et al. | ............... | 715/533 |
| 6,934,683 B2 * | 8/2005 | Ju et al. | ............... | 704/257 |
| 6,941,264 B2 * | 9/2005 | Konopka et al. | ............... | 704/243 |

OTHER PUBLICATIONS

Masaki Murata, Hitoshi Isahara, "Automatic detection of mis-spelled Japanese expressions using a new method for automatic extraction of negative examples based on positive examples", IEICE Transactions, vol. E00-A, No. 1, Jan. 1995.*

(Continued)

*Primary Examiner*—Richemond Dorvil
*Assistant Examiner*—Eric Yen

(57) ABSTRACT

An negative example prediction processing method for predicting a likelihood of examples being negative for data where, with respect to a certain problem, it is not known whether the data is for a correctly worded positive example or for an incorrectly worded negative example. In this negative example prediction processing method, an unknown example x is inputted and a determination is made as to whether or not the example x exists in a positive example database provided in advance. If the example x does not exist, a typical probability of appearance p(x) for the example x is calculated, and a likelihood Q (x) of the example x being an negative example is calculated from the probability of appearance p(x).

5 Claims, 18 Drawing Sheets

OTHER PUBLICATIONS

Daisuke Kawahara, Sadao Kurohashi, "Japanese Case Frame Construction by Coupling the Verb and its Closest Case Component", Graduate School of Informatics, Kyoto University, Mar. 2001.*

Kentaro Torisawa, "An Unsupervised Method for Canonicalization of Japanese Postpositions", Graduate School of Information Sciences, Japan Advanced Institute of Science and Technology.*

Daisuke Kawahara; Nobuhiro Kaji, Sadao Kurohashi, "Japanese Case Structure Analysis by Unsupervised Construction of a Case Frame Dictionary", Graduate School of Informatics, Kyoto University.*

Daisuke Kawahara, Sadao Kurohashi, "Fertilization of Case Frame Dictionary for Robust Japanese Case Analysis", Graduate School of Information Science and Technology, University of Tokyo.*

Cyril N. Alberga, "String Similarity and Misspellings", Communications of the ACM, vol. 10, No. 5, May 1967.*

James L. Peterson, "Computer Programs for Detecting and Correcting Spelling Errors", Communications of the ACM, vol. 23, No. 12, Dec. 1980.*

Andi Wu, Zixin Jiang, "Statistically-Enhanced New Word Identification in a Rule-based Chinese System", ACM, 2000.*

Surapant Meknavin, Boonserm Kijsirku, Ananlada Chotimongkol, Cholwich Nuttee, "Combining Trigram and Winnow in Thai OCR Error Correction", ACM, 1998.*

Tomoyoshi Matsukawa, Scott Miller, Ralph Weischedel, "Example-based correction of word segmentation and part of speech labelling", ACM, 1993.*

Jing-Shin Chang, Yi-Chung Lin, Keh-Yih Su, "Automatic Construction of a Chinese Electronic Dictionary", Proceedings of VLC-95, 1995.*

Kazuhiro Nohtom; *Development of Proofreading Support Tool hsp, Information Processing Institute*, Research and Development Presentation, pp. 9-16; Jan. 31, 1997.

Kawahara et al.; *Methods of Detecting Incorrect Wording Using a Dictionary Extracted from a Corpus*; 54th National Conference of the Information Processing Society, pp. 2-21-2-22; 1997.

Nobuyuki Shiraki et al.; *Making a Japanese Spellchecker by Registering Large Volumes of Strings of Hiragana* ; Annual Conference of the Language Processing Society, pp. 445-448; Mar. 27, 1997.

Tetsuro Araki et al.; *Detection and Correction of Errors in Japanese Sentences Using Two Kinds of Markov Model*, Information Processing Institute, Natural Language Processing Society, NL97-5, pp. 29-35; Sep. 16, 1997.

Takaaki Matsuyama, et al.; *A Thesis on Experiments Relating to Estimation of Relevance Rate and Recall Rate for Evaluating Performance in OCR Error Correction Using n-gram*, Information Processing Society, Annual Conference, pp. 129-132; Mar. 26, 1996.

Koichi Takeuchi et al.; *OCR Error Correction Using Stochastic Language Models*, Information Processing Society Journal, vol. 40, No. 6, pp. 2679-2689; Jun. 1999.

Takeshi Abekawa, et al.; *Analysis of Root Modifiers in the Japanese Language Utilizing Statistical Information*, Annual Conference of the Language Processing Society, pp. 269-272; Mar. 27, 2001.

Timothy Baldwin; *Making Lexical Sense of Japanese-English Machine Translation: A Disambiguation Extravanganza, Technical Report*; Tokyo Institute of Technology, 2001; Technical Report, pp. 69-122, ISSN 0918-2802; Mar. 2001.

Katsuji Omote; *Japanese/English Translation Systems for Embedded Sentences*, Tottori University Graduation Thesis; Mar. 23, 2001.

Takashi Yokomori et al.; *Learning of Formal Languages Centered on Learning from Positive Examples*, Information Processing Society Journal, vol. 32, No. 3, pp. 226-235; Mar. 1991.

Sadao Kurohashi et al.; *Kyoto University Text Corpus Project*, Third Annual Conference of the Language Processing Society, pp. 115-118; Mar. 27, 1997.

Sadao Kurohashi; *Specification Employing Japanese Language Structure Analysis System KNP*, ver.2.0b6; Jun. 1998.

Maki Muruta, Masao Uchiyama, Kiyotaka Uchimoto, Ma Sei and Hitoshi Isahara, *Experiments on Word Sense Disambiguation Using Several Machine-Learning Methods*; The Institute of Electronics, Information and Communication Engineers; NCL 2001-2; pp. 7-14; May 11, 2001.

Nello Cristianini and John Shawe-Taylor; *An Introduction to Support Vector Machines and Other Kernel-Based Learning Methods*, Cambridge University Press; 2000.

Taku Kudoh, Tinysvm; *Support Vector Machines*; http://cl.aist-nara.ac.ip/taku-ku//software/Tiny_SVM/index.html; 2000.

* cited by examiner

FIG.5

| | |
|---|---|
| 1 | 自然なつながりがもつようにする必要がある。<br>shizen na tsunagari ga motsu youni suru hitsuyou ga aru. |
| 2 | 「〜する」「〜した」などの表現が用いられる。<br>"...suru" "...shita" nadono hyougen ga mochiiraru. |
| 3 | 例えば、図ようなのネットワークから、<br>tatoeba, zu youna no netto wahku kara, |
| 4 | 「咲く」を含む文でのは次ようなた対応関係を<br>"saku" wo fukumu bun deno wa tsugi youna taiou kankei wo |
| 5 | 可能な連体節ができる場合は、この連体節を<br>kanou na rentaisetsu ga de aru baai wa, kono rentaisetsu wo |
| 6 | 説明した方法でを用いることができる<br>setsumei shita houhou de wo mochiiru kotoga dekiru |
| 7 | 文として出力する方が適切があると考え、<br>bun toshite shutsuryoku suru hou ga tekisetsu ga de aru to kangae, |
| 8 | 主題と述語が与えらた場合に意味ネットワーク<br>shudai to jutsugo ga atae rata baai ni imi netto wahku |
| 9 | 可能な場合にはすべての並列節といって出力した<br>kanou na baai ni wa subete no heiretsu setsu to ite shutsuryoku shita |

FIG.6

| Ex. | NEGATIVE EXAMPLE LIKELIHOOD | FORMER CONTEXT | BINOMIAL RELATIONSHIP | | LATTER CONTEXT |
|---|---|---|---|---|---|
| 1 | 0.99999 | setsumei shita hou 説明した方 | hou de 法で | wo を | mochiiru kotoga dekiru 用いることができる |
| 2 | 0.99999 | "shita" nadono hyouki ga mochi したなどの表記が用 | ira いら | ru る | 。 |
| 3 | 0.99999 | "saku" wo fukumu bun deno wa 咲くを含む文でのは | tsugi 次 | you よう | na taiou kankei wo な対応関係を |
| 4 | 0.99999 | shudai to jutsugo ga atae 主題と述語が与え | ra ら | ta ba た場 | ai ni imi netto wahku 合に意味ネットワーク |
| 5 | 0.99999 | shite shutsuryoku suru houga tekisetsu して出力する方が適切 | ga が | de aruto であると | kangae, 考え、 |
| 6 | 0.99999 | bun toshite shutsuryoku suru houga 文として出力する方が | tekisetsu 適切 | ga が | de aruto kangae, であると考え、 |
| 7 | 0.99999 | tatoeba, 例えば、 | zu 図 | you よう | na no netto wahku kara なのネットワークから |
| 8 | 0.99999 | go ga atae rareta baai ni i 語が与えられた場合に意 | mi 味 | ne ネ | tto wahku ットワーク |
| 9 | 0.99999 | ai ni wa subeteno heiretsu setsu 合にはすべての並列節 | toi とい | te shutsu て出 | ryoku shita 力した |
| 10 | 0.99999 | ai ni wa subeteno heiretsu setsu 合にはすべての並列節 | to と | i te shutsu いて出 | ryoku shita 力した |

FIG.7

|  |  | RECALL RATE | PRECISION RATE |
|---|---|---|---|
| RESULTS OF THE PRESENT INVENTION | | | |
| UPPER RANKED | 50 ITEMS | 2.88% | 92.00% |
| UPPER RANKED | 100 ITEMS | 5.31% | 85.00% |
| UPPER RANKED | 200 ITEMS | 9.69% | 77.50% |
| UPPER RANKED | 300 ITEMS | 12.88% | 68.67% |
| UPPER RANKED | 500 ITEMS | 18.56% | 59.40% |
| UPPER RANKED | 800 ITEMS | 24.06% | 48.12% |
| UPPER RANKED | 1,200 ITEMS | 29.12% | 38.83% |
| UPPER RANKED | 1,600 ITEMS | 32.38% | 32.38% |
| UPPER RANKED | 3,000 ITEMS | 39.75% | 21.20% |
| UPPER RANKED | 5,000 ITEMS | 47.38% | 15.16% |
| UPPER RANKED | 10,000 ITEMS | 57.38% | 9.18% |
| UPPER RANKED | 20,000 ITEMS | 67.81% | 5.42% |
| UPPER RANKED | 50,000 ITEMS | 81.38% | 2.60% |
| UPPER RANKED | 100,000 ITEMS | 89.31% | 1.43% |
| RESULTS OF RELATED ART A | | | |
| TOTAL NUMBER DETECTED | 5,295 ITEMS | 25.31% | 7.65% |

FIG.8

|  |  | RECALL RATE | PRECISION RATE |
|---|---|---|---|
| RESULTS OF THE PRESENT INVENTION | | | |
| UPPER RANKED | 50 ITEMS | 3.12% | 100.00% |
| UPPER RANKED | 100 ITEMS | 5.94% | 95.00% |
| UPPER RANKED | 200 ITEMS | 11.56% | 92.50% |
| UPPER RANKED | 300 ITEMS | 16.62% | 88.67% |
| UPPER RANKED | 500 ITEMS | 25.25% | 80.80% |
| UPPER RANKED | 800 ITEMS | 34.25% | 68.50% |
| UPPER RANKED | 1,200 ITEMS | 42.44% | 56.58% |
| UPPER RANKED | 1,600 ITEMS | 48.06% | 48.06% |
| UPPER RANKED | 3,000 ITEMS | 61.38% | 32.73% |
| UPPER RANKED | 5,000 ITEMS | 70.81% | 22.66% |
| UPPER RANKED | 10,000 ITEMS | 81.12% | 12.98% |
| UPPER RANKED | 20,000 ITEMS | 87.62% | 7.01% |
| UPPER RANKED | 50,000 ITEMS | 94.44% | 3.02% |
| UPPER RANKED | 100,000 ITEMS | 97.81% | 1.57% |
| RESULTS OF RELATED ART A | | | |
| TOTAL NUMBER DETECTED | 5,944 ITEMS | 60.94% | 16.40% |

FIG.9

|  |  | RECALL RATE | PRECISION RATE |
|---|---|---|---|
| RESULTS OF THE PRESENT INVENTION | | | |
| UPPER RANKED | 50 ITEMS | 3.12% | 100.00% |
| UPPER RANKED | 100 ITEMS | 6.00% | 96.00% |
| UPPER RANKED | 200 ITEMS | 11.62% | 93.00% |
| UPPER RANKED | 300 ITEMS | 16.69% | 89.00% |
| UPPER RANKED | 500 ITEMS | 24.88% | 79.60% |
| UPPER RANKED | 800 ITEMS | 33.88% | 67.75% |
| UPPER RANKED | 1,200 ITEMS | 41.94% | 55.92% |
| UPPER RANKED | 1,600 ITEMS | 47.19% | 47.19% |
| UPPER RANKED | 3,000 ITEMS | 60.44% | 32.23% |
| UPPER RANKED | 5,000 ITEMS | 69.88% | 22.36% |
| UPPER RANKED | 10,000 ITEMS | 80.62% | 12.90% |
| UPPER RANKED | 20,000 ITEMS | 88.69% | 7.09% |
| UPPER RANKED | 50,000 ITEMS | 95.25% | 3.05% |
| UPPER RANKED | 100,000 ITEMS | 98.12% | 1.57% |
| RESULTS OF RELATED ART A | | | |
| TOTAL NUMBER DETECTED | 5,944 ITEMS | 62.12% | 16.72% |

FIG.11

| | RECALL RATE | RELEVANCE RATE | CORRECT RATE |
|---|---|---|---|
| UPPER RANKED 10 ITEMS | 3.75% | 100.00% | 70.46% |
| UPPER RANKED 20 ITEMS | 7.12% | 95.00% | 71.38% |
| UPPER RANKED 30 ITEMS | 8.99% | 80.00% | 71.38% |
| UPPER RANKED 40 ITEMS | 10.86% | 72.50% | 71.38% |
| UPPER RANKED 50 ITEMS | 13.48% | 72.00% | 71.84% |
| UPPER RANKED 100 ITEMS | 20.97% | 56.00% | 70.69% |
| UPPER RANKED 150 ITEMS | 28.46% | 50.67% | 69.54% |
| UPPER RANKED 200 ITEMS | 33.33% | 44.50% | 66.78% |
| UPPER RANKED 300 ITEMS | 39.70% | 35.33% | 59.20% |
| TOTAL NUMBER DETECTED 393 ITEMS | 42.32% | 28.75% | 50.11% |

FIG.13

| PROBLEM | SOLUTION |
|---|---|
| setsumei shita houhou de <|> wo mochiiru koto ga dekiru<br>説明した方法で<|>を用いることができる | NEGATIVE |
| setsumei shita houhou <|> de wo mochiiru koto ga dekiru<br>説明した方法<|>で を用いることができる | POSITIVE |
| ... | ... |

<|> : SPACE

FIG.15

Previous terms "shita houhou de" (した方法で)

Previous terms "ta houhou de" (た方法で)

Previous terms "houhou de" (方法で)

Previous terms "hou de" (法で)

Previous terms "de" (で)

Following terms "wo mochiiru ko" (を用いるこ)

Following terms "wo mochiiru" (を用いる)

Following terms "wo mochii" (を用い)

Following terms "wo mochi" (を用)

Following terms "wo" (を)

ta houhou de <|>   (た方法で <|>)

houhou de <|> wo   (方法で <|> を)

hou de <|> wo mochi   (法で <|> を用)

de <|> wo mochii   (で<|> を用い)

<|> wo mochiiru   (<|> を用いる)

Previous terms "de" (で)

Following terms "wo" (を)

Previous terms "particle"

Following terms "particle"

FIG.18
PRIOR ART

| EXAMPLE SENTENCE | "fu no jirei no kenshutsu" (「負の事零の検出」) |
|---|---|
| POINT USING TRIGRAM | −1  −1  −1<br>−1  −1  −1 |
| TOTAL POINTS | −1  −2  −2  −1 |

↑
INCORRECT

METHOD FOR PREDICTING NEGATIVE EXAMPLE, SYSTEM FOR DETECTING INCORRECT WORDING USING NEGATIVE EXAMPLE PREDICTION

BACKGROUND OF THE INVENTION

1. Field of the Invention

The invention relates to technology for performing language analysis of sentence data using examples of phrases and sentences. More specifically, the present invention relates to a method for predicting negative examples from positive examples, a method for detecting an incorrect wording using the predicted negative examples, or extracting non-case relational relative clause (relative clauses that do not have correct case relations with respective main clauses) from a sentence.

The present invention can be applied to determine case relationships occurring in a sentence, wording errors and syntax analysis, but it is by no means limited to these applications. The present invention can therefore be used, for example, in the detection of incorrect wording of actual Japanese sentences and can be applied together with word processor systems and OCR reading systems.

2. Description of the Related Art

A process for predicting negative examples from positive examples is a process that takes correct phrases or sentences as positive examples, takes incorrect phrases or sentences as negative examples, and predicts negative examples from the positive examples. Positive examples can be acquired relatively easily by utilizing a corpus (i.e., a collection of correct Japanese sentences) or the like, but negative examples cannot be easily acquired. A process for generating such negative examples can only be performed manually so that such a negative examples creation process tends to be excessively work intensive.

In a simple method for predicting a negative example from positive examples, input examples that do not appear in known positive examples are all considered to be negative examples.

However, in reality, the existence of positive examples that are not yet among the positive examples should be considered. If negative examples are predicted using this kind of simple method, there is a problem that a large number of new positive examples are determined to be negative examples. It is therefore not possible to apply negative examples generated using this method to highly precise processing.

A method is therefore required for predicting negative examples from a large number of positive examples. For example, assuming that all data of a large scale existing corpus (for example, a collection of Japanese sentences) to be correct, then all the sentences existing in the corpus can be considered to be correct sentences (positive examples). Negative examples can then be automatically generated by using a method where each of the sentences in the corpus are used as positive examples and processing is carried out to predict negative examples that are incorrectly worded. In the implementation of a processing method for predicting negative examples from positive examples, the detection of actual incorrectly worded sentences is useful when there are positive examples but the acquisition of negative examples is difficult.

For example, a process for detecting incorrect wording in Japanese sentences is extremely difficult compared to the case of English sentences. A space is left between words in English sentences, so that spell-checking of the words can be carried out to a substantially high precision by basically preparing a word dictionary and rules for the changing of word endings. However, in the Japanese sentences, the words are connected and a high-precision result is hard to be achieved even with processing limiting the incorrect wording.

Further, in addition to incorrect wording, grammatical errors, such as errors in usage of particles such as "te(て)", "ni(に)", "wo(を)", and "ha(ha)" may also exist. Wording errors based on grammatical errors are difficult to detect, regardless of whether the sentences are Japanese sentences or English sentences.

The following is related prior art for detecting wording errors in the Japanese language.

Related methods for detecting incorrect wording based on word dictionaries, a dictionary listing a succession of hiragana, and a dictionary listing articulation conditions are described in the following cited references 1 to 3. In these related methods, incorrect wording is determined when a wording appears that is not listed in the word dictionary or the dictionary listing a succession of hiragana, or in the case of the appearance of an articulation that is not sufficiently covered by the articulation conditions listed in the dictionary.

[Cited reference 1: 納富一宏,日本語文書校正支援ツールh s p の開発, 情報処理学会研究発表会(Kazuhiro Nohtom, Development of Proofreading Support Tool hsp, Information Processing Institute, Research and Development Presentation (digital documents)), pp. 9-16, (1997)]

[Cited reference 2: 川原一真 他 コーパスから抽出された辞書を用 いた表記誤り検出法, 情報処理学会第５４回全国大会(Kawahara et al., Methods of Detecting Incorrect Wording Using a Dictionary Extracted from a Corpus, 54th National Conference of the Information Processing Society), pp. 2-21-2-22, (1997)]

[Cited reference 3: 白木伸征 他, 大量の平仮名列登録に よる日本語スペルチェ ッカの作成, 言語処理学会年次大会(Nobuyuki Shiraki et al., Making a Japanese Spellchecker by Registering Large Volumes of Strings of Hiragana, Annual Conference of the Language Processing Society, pp. 445-448, (1997))

Also, a related art where probabilities of occurrence are obtained for each character string based on a probability model utilizing n-gram of a character unit, with locations where character strings for which the probability of occurrence is low then being determined to be incorrect wordings is disclosed in the following cited references 4 to 6.

The technique using n-gram probability in cited reference 5 below is used in the detection of wording errors occurring in error correction systems mainly for optical character readers (OCRs). In the case of the OCR error correction system, assuming that the probability of appearance of incorrect wording is high at 5 to 10%, this is higher than the probability of a person writing would usually have of making a mistake. This is a relatively straightforward problem, and the recall rate and relevance rate for the detection of wording errors can therefore easily become high.

[Cited reference 4: 荒木哲郎 他2重マルコフ モデルによ る日本語文の誤り検 出並びに訂正法, 情報処理学会自然言語処理研究会(Tetsuro Araki et. al., Detection and Correction of Errors in Japanese Sentences Using Two Kinds of Markov Model, Information Processing Institute, Natural Language Processing Society), NL97-5, pp. 29-35, (1997)]

[Cited reference 5: 松山高明 他, A, n-g r a m によるo c r 誤り検出の能力検 討のための適合率と再現率の推定に関する実験と考察, 言語処理学会年次大会(Takaaki Matsuyama, et. al., A Thesis on Experiments Relating to Estimation of Relevance Rate and Recall Rate for Evaluating Performance in OCR Error Correction Using n-gram, Information Processing Society, Annual Conference), pp. 129-132, (1996)]

[Cited Reference 6: 竹内孔一 他, 統計的言語 モデルを用 いたＯＣＲ誤り修正 システムの構築, 情報処理学 会論文誌(Koichi Takeuchi et. al., OCR Error Correction Using Stochastic Language Models, Information Processing Society Journal), Vol. 40, No. 6, (1999)].

The method of the related art by Takeuchi et. al. considered to be the most appropriate, i.e. the related art disclosed in cited reference 6 (hereinafter referred to as related art A) is briefly described in the following.

In related art A, first, the text for which it is wished to detect incorrect wording is extracted one character at a time from the top so as to extract three consecutive characters. When the probability of appearance of the extracted portion in the corpus (collection of correct Japanese sentences) is Tp or less, −1 is associated to these three consecutive characters, and characters for which the provided value is Ts or greater are then determined to be incorrect. For example, Tp is taken to be zero, and Ts is taken to be −2. By making Tp zero, it is sufficient simply to check whether or not these three consecutive characters appear in the corpus without it being necessary to expressly obtain the probability of appearance. When Tp>0, an error is determined even if the extracted portion appears in the corpus. However, if the characters appear in the corpus even if the probability of appearance is low, then this is taken not to be an error and it is therefore preferable to set Tp=0 rather than Tp>0.

As a supplement to related art A, a description is given of processing for carrying out error detection on Japanese expressions referred to as "fu no jirei no kenshutsu" (「負の事零の検出」). At this time, the three consecutive characters of "fu no koto"(「負の事」) and "no jirei"(「の事零」) are allocated from the top of the Japanese expression, a check is made as to whether this is in the corpus, and −1 is assigned to these three characters if the allocated three characters are not present in the corpus. In this case, as there is no "nojirei"(「の事零」) or "jireino"(「事零の」), points are assigned according to the trigram shown in FIG. 18, and the portion for "ji"(「事」) and "rei"(「零」) that is assigned "−2" is determined to be erroneous. The related art method A is therefore a method where a 3-gram character appearing in the corpus with a high frequency can be efficiently combined to detect errors.

However, the processing in the related method A is a process for determining whether or not this expression exists in the corpus. This is to say that the related method A is similar to the other aforementioned related methods in that items that do not appear in the dictionary are taken to be errors.

Next, a description is given of technology for extracting non-case relational relative clauses. A non-case relational relative clause refers to where a verb for an attributive modifying clause and a noun for an element subject to a modifier constitute a sentence with no case relationship, and where a case relationship between a verb for a clause of an embedded sentence and its preceding relative noun is not established.

A sentence "fu no jirei wo chushutsu suru koto wa muzukashii"(「負の事例を抽出することは難しい。」) is taken as an example. In the relative clause "fu no jirei wo chushutsu suru koto"(「負の事例を抽出すること」), a case relationship such as "koto ga chushutsu suru"(「ことが抽出する」) or "koto wo chushutsu suru"(「ことを抽出する」) and such is not established between the verb of "chushutsu suru"(「抽出する」) and the preceding noun "koto"(「こと」). Namely, this is taken to be a non-case relational relative clause because there is no case relationship such as a "ga(が)" case or a "wo(を)" case between "chushutsu suru"(「抽出する」) and "koto"(「こと」). Conversely, sentences for which case relationships can be established are referred to as sentences for internal relationships.

In addition to the aforementioned format, sentences also have complex structures such as "sanma wo yaku kemuri" (「さんまを焼くけむり。」). When an attributive modifying clause in the case relationship is taken to be a positive example, the sentence for the non-case relational relative clause is taken to be a negative example. A large number of declinable words (for example, verb) in the case relationship and nouns exist within the corpus. Therefore, from the present invention, when a non-case relational relative clause for this negative example is predicted taking this information as a positive example, the non-case relational relative clause taken as an negative example can be automatically extracted from verbs and nouns in each case relationship taken as a positive example.

The methods disclosed in the following cited references 7 to 9 are also provided as related methods for extracting sentences for non-case relational relative.

[Cited reference 7: 阿辺川武 他, 統計情報を利用した日本語連体修飾節の解析, 言語処理学会年次大会 (Takeshi Abekawa, et. al., Analysis of Root Modifiers in the Japanese Language Utilizing Statistical Information, Annual Conference of the Language Processing Society), pp. 270-271, (2001)]

[Cited reference 8: Timothy Baldwin, Making Lexical Sense of Japanese-English Machine Translation: A Disambiguation Extravaganza, Technical Report, (Tokyo Institute of Technology, 2001), Technical Report, pp. 69-122, ISSN 0918-2802]

[Cited reference 9: 表克次, 埋め込み文の日英翻訳方式, 鳥取大学卒業論文(Katsuji Omote, Japanese/English Translation Systems for Embedded Sentences, Tottori University graduation thesis), (2001)]

In the related art of cited reference 7, using the attributive modifier relationship and the case relationship, it is noted that there are large differences in the distribution of different numbers of verbs making up these relationships, and sentences for non-case relational relative are then specified by evaluating differences in this distribution using a K-L distance. Further, in cited reference 8, from research into using a method where nouns that easily become non-case relational relative clauses with respect to embedded clauses etc. are extracted with manual rules then utilizing this information, a method is cited where non-case relational relative clauses are specified using supervised machine learning techniques taking a wide range of information included in case frame information as attributes. The technique for cited reference 9 is a technique for determining whether a clause is non-case relational relative or case relational relative using case frame information in order to translate embedded sentences from Japanese to English.

Further, it is well know that learning is typically difficult using just positive examples, as is described in the following with reference to cited reference 10. If the machine learning method is a method using both positive examples and negative examples as supervised data (teaching signals), more highly precise processing is anticipated but precision of processing with machine learning methods only using positive examples is considered a problem.

[Cited reference 10: 横森貫 他, 形式言語の学習―正の例からの学習を中心に―, 情報処理学会誌 (Takashi Yokomori et. al., Learning of Formal Languages Centered on Learning from Positive examples, Information Processing Society Journal), Vol. 32, No. 3, pp. 226-235, (1991)]

As described above, in a process for predicting negative examples from positive examples, it is desirable to have a practical method for which precision is high.

In the related art methods using machine learning taking only positive examples as teaching signals, high precision processing is not achieved and the acquisition of negative examples as teaching signals is difficult. Processing for detection of incorrect wording of passages is then implemented by utilizing machine learning taking both positive examples and negative examples as teaching signals.

SUMMARY OF THE INVENTION

It is an object of the present invention to provide a practical processing method for generating negative examples from positive examples having a precision that could not be achieved in the related prior art, and a program for implementing this processing method on a computer.

It is a further object of the present invention to provide a method for detecting incorrect wording using negative example prediction processing data and a program for implementing this method on a computer.

There is further provided a method for extracting sentences having non-case relational relative clauses for case relationships using negative example prediction processing data and a program for implementing this method on a computer.

It is a still further object of the present invention to provide a method for high-precisely detecting incorrect wording using a machine learning method adopting positive examples and negative examples as supervised data and a program for implementing this detecting method on a computer.

It is a still further object of the present invention to provide a method for high-precise detecting incorrect wording automatically generating negative examples as supervised data from positive examples in an efficient manner using a machine learning method adopting generated negative examples and positive examples as supervised data, and a program for implementing this detecting method on a computer.

A method for predicting whether data is positive or negative comprises: accessing a positive example data storage unit pre-storing groups of positive example data constituting correction examples for the problem, determining whether or not the data exists in the positive example data groups, calculating a typical probability of appearance of the data when the data does not exist in the positive example data groups, and calculating a probability of appearance of the data in the positive example data group based on the typical probability of appearance and taking the probability as a likelihood of a negative example.

A computer readable medium recorded with a program for implementing a processing method for predicting whether data that is not yet known to be positive or negative with respect to a certain problem is positive or negative on a computer, comprises: accessing a positive example data storage unit pre-storing groups of positive example data constituting correction examples for the problem, determining whether or not the data exists in the positive example data groups, calculating a typical probability of appearance of the data when the data does not exist in the positive example data groups, and calculating a probability of appearance of the data in the positive example data group based on the typical probability of appearance and taking the probability as a likelihood of an negative example.

The negative example prediction processing method of the present invention first calculates a typical probability of appearance $p(x)$ for an example x that is not yet determined to be a positive example or an negative example. Next, when the data does not appear in the existing positive example data D, the probability of appearance $p(x)$, i.e. when an item does not appear in the existing positive example data D is used regardless of whether the typical probability of appearance is high and should naturally appear in the positive example data D, the likelihood of the item being an negative example may be estimated to be high.

A processing method for predicting negative examples from positive examples that could not be implemented in the related art is provided. It is therefore possible to automatically generate negative examples from a large number of positive examples, the acquisition of the collection and generation of which has been difficult.

A computer readable medium may be provided recorded with a program for implementing processing to detect incorrect wording using a method for predicting negative examples on a computer, the method comprising accessing a positive example data storage unit pre-storing groups of positive example data constituting correctly worded data, determining whether or not the input wording exists in the positive example data groups, calculating a typical probability of appearance of the input wording when the input wording does not exist in the positive example data groups, and calculating a probability of appearance of the input wording in the positive example data group based on the typical probability of appearance and taking the probability as a likelihood of a negative example.

A processing program recorded on a computer-readable recording medium accesses pre-storing positive example data groups constituting correctly worded data in a positive example data storage unit, determines whether or not input wording exists in the positive example data groups, so that when the input wording does not exist in the positive example data groups, a typical probability of appearance is calculated for the input wording, the probability of the input wording appearing in the positive example data group is calculated based on the typical probability of appearance, and the probability is taken to be the likelihood of a negative example.

A computer-readable recording medium may also be provided recorded with a program for implementing processing to extract embedded clauses constituting non-case relational relative clauses using a method for predicting negative examples on a computer, the method comprising: accessing a positive example data storage unit pre-storing groups of positive example data constituting internal relationship sentences, determining whether or not an input embedded clause exists in the positive example data groups, calculating a typical probability of appearance of the embedded clause when the embedded clause does not exist in the positive example data groups, and calculating a probability of appearance of the embedded clause in the positive example data group based on the typical probability of appearance and taking the probability as a likelihood of a negative example.

A processing program recorded on a computer-readable recording medium of the present invention performs pre-storing positive example data groups constituting internal relationship sentences in a positive example data storage unit, determining whether or not input embedded clause exists in the positive example data groups, so that when the embedded clause does not exist in the positive example data groups, a typical probability of appearance is calculated for the embedded clause, the probability of the embedded clause appearing in the positive example data group being calculated based on the typical probability of appearance, and the probability is taken to be the likelihood of a negative example so as to calculate a negative example likelihood.

The present invention may also include extracting sentences having non-case relational relative clauses for the detection of incorrect wording of actual sentences and the extraction of sentences having a non-case relational relative clause for case relationships for sentences, and resolves these problems with a practical degree of precision.

The incorrect wording also includes items based on incorrect grammar in addition to incorrect wording of words, but the present invention is by no means limited to Japanese and English sentences and may be applied to other processing for detecting incorrect wording. The present invention is by no means limited to the processing shown in the examples and can also be applied to various general problems where positive examples exist but where the acquisition of negative examples is difficult.

Further, the present invention can also provide positive example prediction processing capable of outputting a positive example likelihood constituting the results of positive example prediction processing as a numeric value so as to enable the processing results to be utilized in various post processing.

The present invention also provides a processing method for detecting incorrect wording using supervised machine learning techniques, comprising: extracting pairs of features and solutions from supervised data including correctly worded positive example data and incorrectly worded negative example data, performing machine learning taking the extracted pairs of features and solutions as supervised data, and storing learning results in a learning results data storage unit; and extracting features from input data and detecting incorrect wording based on the learning results saved in the learning results data storage unit.

Further, the present invention also comprises a computer-readable recording medium recorded with a program for implementing processing to detect incorrect wording using supervised machine learning methods, comprising: extracting pairs of features and solutions from supervised data including correctly worded positive example data and incorrectly worded negative example data, performing machine learning taking pairs of features and solutions as supervised data, and storing learning results in a learning results data storage unit and extracting features from input data and detecting incorrect wording in the input data based on the learning results.

The present invention also provides a processing method for detecting incorrect wording comprising the steps of a typical probability of appearance calculating process for calculating typical probability of appearance for examples when inputted examples to not exist in prepared correctly worded positive example data, a process of calculating probability of the example appearing in the positive example data based on the typical probability of appearance, and taking the example as negative example data when the probability exceeds a prescribed threshold value, processing for extracting pairs of features and solutions from supervised data including positive example data and negative example data, performing machine learning taking pairs of features and solutions as borrowing supervised data, and storing learning results in a learning results data storage unit, and processing for extracting features from inputted data and detecting incorrect wording in the data based on the learning results.

The present invention also provides a recording medium for recording a program for executing on a computer a processing method for detecting incorrect wording using supervised machine learning methods comprising the steps of a typical probability of appearance calculating process for calculating typical probability of appearance for examples when inputted examples to not exist in prepared correctly worded positive example data, a process of calculating probability of the example appearing in the positive example data based on the typical probability of appearance, and taking the example as negative example data when the probability exceeds a prescribed threshold value, processing for extracting pairs of features and solutions from supervised data including positive example data and negative example data, performing machine learning taking pairs of features and solutions as borrowing supervised data, and storing learning results in a learning results data storage unit, and processing for extracting features from inputted data and detecting incorrect wording in the data based on the learning results.

The present invention also provides processing for extracting pairs of features and solutions from supervised data including correctly worded positive example data and incorrectly worded negative example data, performing machine learning taking pairs of features and solutions as borrowing supervised data, and storing learning results in a learning results data storage unit. This is then followed by process for extracting features from inputted target data and detecting incorrect wording in the data based on the learning results.

The present invention also performs a typical probability of appearance calculating process for calculating typical probability of appearance for examples when inputted examples to not exist in prepared correctly worded positive example data. There is also provided a process of calculating probability of the example appearing in the positive example data based on the typical probability of appearance, and taking the example as negative example data when the probability exceeds a prescribed threshold value. This is then followed by processing for extracting pairs of features and solutions from supervised data including positive example data and negative example data, performing machine learning taking pairs of features and solutions as borrowing supervised data, and storing learning results in a learning results data storage unit. This is followed by processing for extracting features from inputted data and detecting incorrect wording based on the learning results saved in the learning results data storage unit.

The present invention provides an incorrect wording detection processing method employing positive examples and negative examples as supervised data. The present invention can therefore obtain highly precise processing results by using information for negative examples compared to incorrect wording detection processing methods using only positive examples.

BRIEF DESCRIPTION OF THE DRAWINGS

FIG. 5 is a view showing an example of a sentence including errors.

FIG. 6 is a view showing results of a process for detecting incorrect wording.

FIG. 7 is a view illustrating the precision of an incorrect wording detection process where one character is deleted.

FIG. 8 is a view illustrating the precision of an incorrect wording detection process where one character is replaced.

FIG. 9 is a view illustrating the precision of an incorrect wording detection process where one character is inserted.

FIG. 11 is a view illustrating a processing accuracy for extraction of sentences having non-case relational relative clauses.

FIG. 13 is a view illustrating an exemplary configuration of data in a supervised data storage unit.

FIG. 15 is a view illustrating an example of a feature.

FIG. 18 is a view illustrating a prior art related method.

DETAILED DESCRIPTION OF THE PREFERRED EMBODIMENTS

Figure 1:
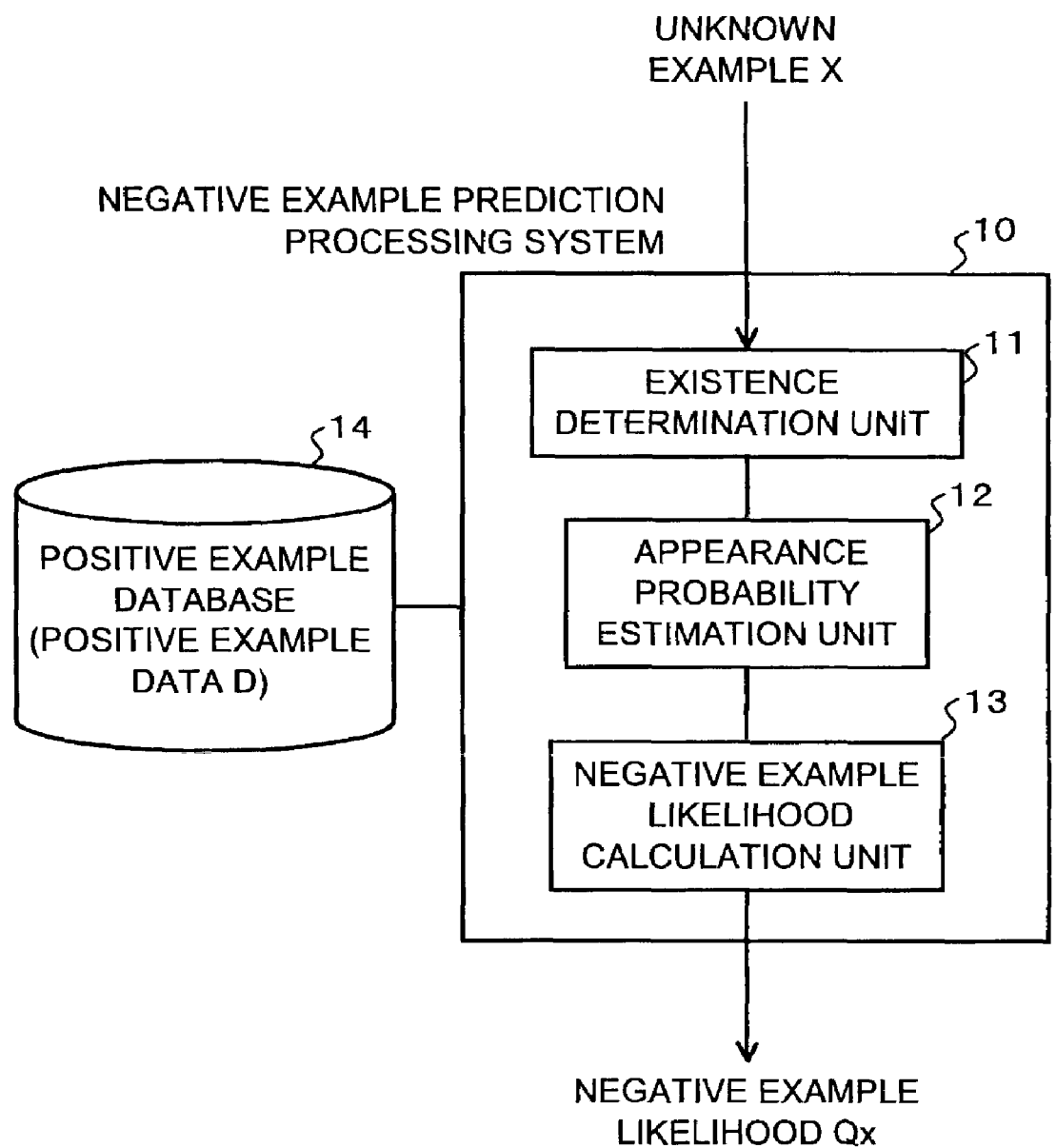
FIG. 1 is a block diagram showing an exemplary configuration of an embodiment of a negative example prediction processing system according to the present invention.

FIG. 1 shows an exemplary configuration of an embodiment of a negative example prediction processing system according to the present invention. The negative example prediction processing system 10 has an existence determination unit 11, an appearance probability estimation unit 12, a negative example likelihood calculation unit 13, and a positive example database 14.

The existence determination unit 11 determines whether or not an input unknown example x exists in the positive example database 14. The appearance probability estimation unit 12 calculates a typical probability of appearance (frequency) $p(x)$ for the example x. The negative example likelihood calculation unit 13 calculates a likelihood $Q(x)$ for an negative example of the example x based on the typical probability of appearance (frequency) $p(x)$. The positive example database 14 stores positive example data (e.g., a database) D.

Figure 2:
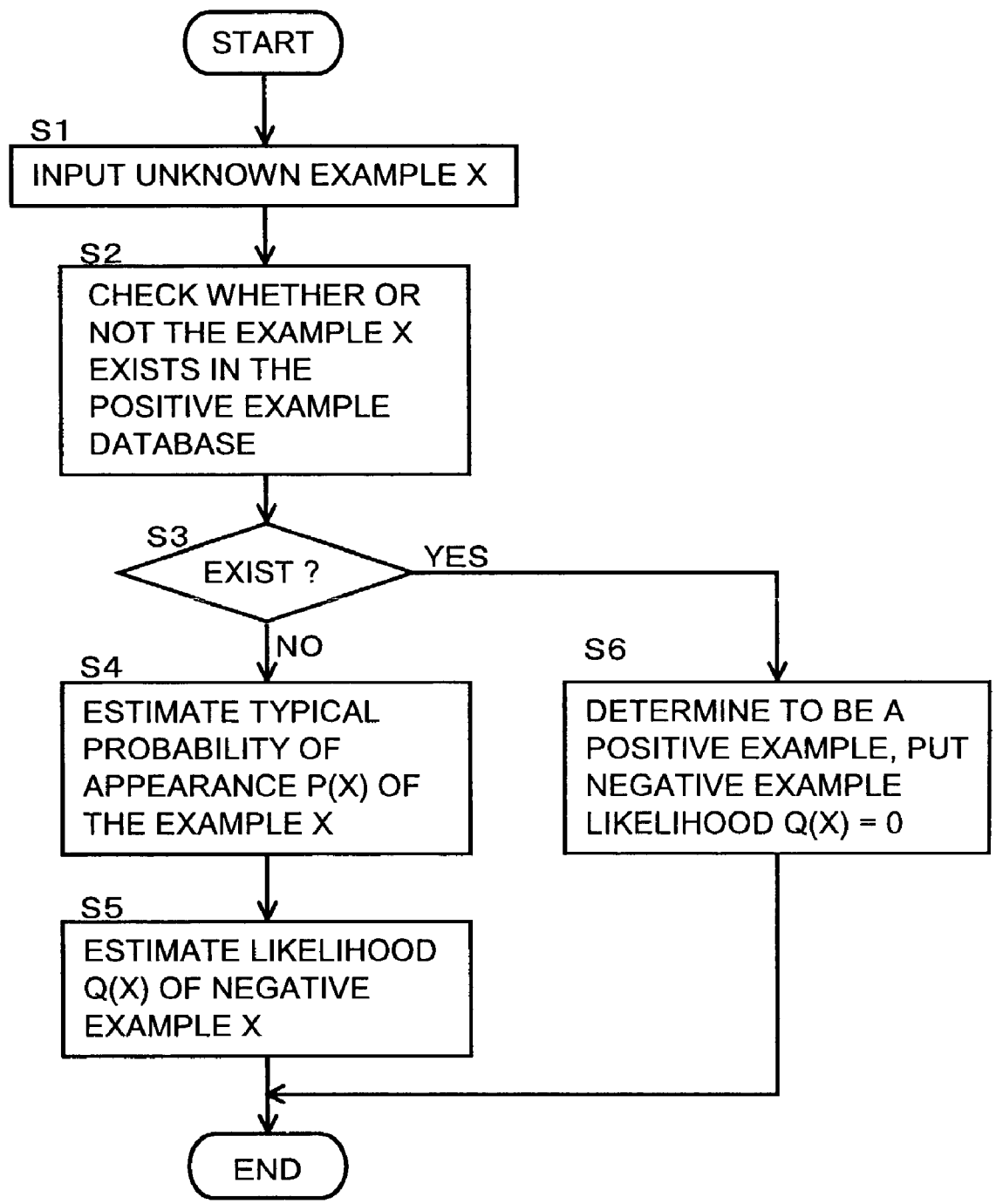
FIG. 2 is a flowchart of a process for predicting negative examples.

FIG. 2 shows a flow for a process for predicting negative examples.

First, the existence determination unit 11 inputs an unknown example x which is to be determined to be a positive example or a negative example (step S1). The input unknown example x is parsed using a binomial relationship of (a, b). The existence determination unit 11 then checks whether or not the input unknown example x is included positive example data D (step S2), with the processing in step S3 and step S4 being carried out when the input unknown example x is not included in the positive example data D. In step S4, a typical probability of appearance $p(x)$ is estimated for the as yet unknown example x. For example, if the input unknown example x consists of two independent parts or terms a and b that are in the binomial relationship (a, b), and assuming that the terms a and b are mutually independent, a probability of appearance $p(x)$ for the input unknown example x according to the binomial relationship (a, b) is taken to be the product $p(a) \times p(b)$ when the probability of appearance for a and b in the positive example data D. Namely, a typical probability of appearance $p(x)$ is calculated using the probabilities of each of the terms a and b when the example x has the two parts a and b in a binomial relationship (a, b) and assuming each term a and b to be independent. Calculating typical probability of appearance $p(x)$ of the example x is by no means limited to the above method and may be calculated using other methods.

Next, the negative example likelihood calculation unit 13 uses the probability of appearance $p(x)$ of the example x to estimate a probability $Q(x)$ of the appearance of the example x in the positive example data D (step S5). At this time, assuming that there are n items in the positive example data D that are independent of each other, the probability that the example x does not appear is $1-p(x)$. When this then occurs n consecutive times, the probability that the example x does not appear in the positive example data D is $(1-p(x))n$, and probability that the example x appears in the positive example data D becomes $Q(x)=1-(1-p(x))^n$. Here, "a small probability $Q(x)$" refers to when, stochastically, the probability of the example x appearing in the positive example data D is low, and means that it is ensured that stochastically, x does not appear because the positive example data D (corpus) is small, which means that "it is possible that x is a positive example", Conversely, "large probability $Q(x)$" means that, stochastically, the probability of the example x appearing in the positive example data D is high and that, stochastically, x will naturally appear in the corpus, so that actual non-appearance of x in the corpus would mean that an inconsistency had occurred. This inconsistency runs contrary to the typical probability of appearance $p(x)$ and to various independent assumptions. Here, when it is assumed anew that "when the example is a positive example, the typical probability of appearance $p(x)$ and the various independent assumptions are correct", "it is not possible that example x is a positive example" is derived from this inconsistency.

In other words, "the probability $Q(x)$ of the example x appearing in the positive example data D" means "the probability $Q(x)$ that the example x is not a positive example". This means that $Q(x)$ refers to the likelihood of an negative example. $Q(x)$ is therefore taken to be "the likelihood of an negative example", with a large $Q(x)$ for example x giving a large likelihood that the example x is an negative example.

In the processing in step S4, when the example x is included in the database 14 for the positive example data D, the negative example likelihood calculation unit 13 determines the example x to be a positive example, and the likelihood of an negative example $Q(x)$ is taken to be 0 (step S6). In the above description, the present invention is capable of predicting negative examples using frequency information of the positive example data D and is capable of putting the likelihood of a negative example into numerical form for outputting.

Next, a description is given of preferred embodiments of the present invention to illustrate the effectiveness and flexibility of the present invention. First, in a practical example of the present invention, a description is given of processing in the case of applying the present invention to problems in the detection of incorrect wording in Japanese.

Figure 3:
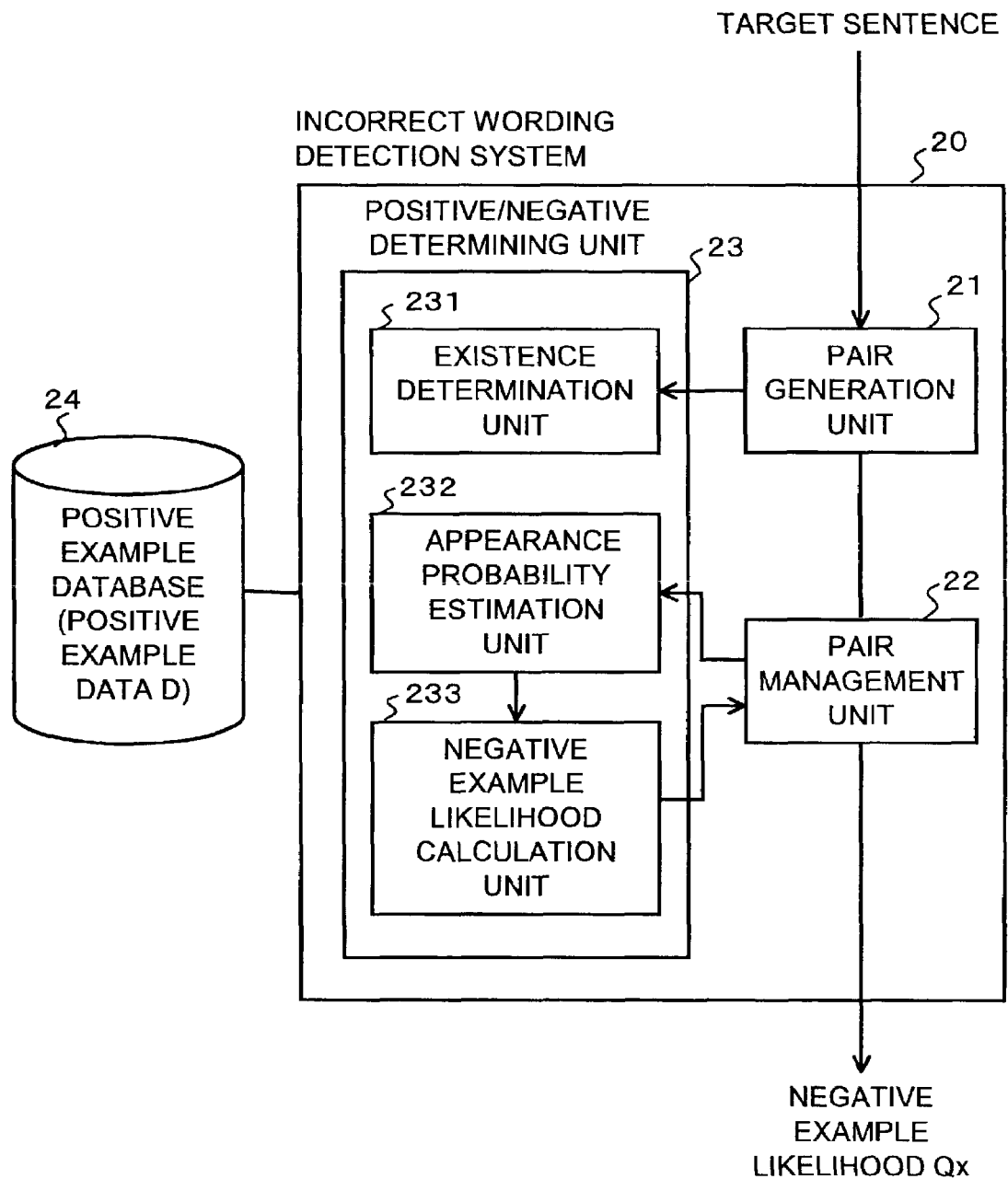
FIG. 3 is a block diagram showing an exemplary configuration for an incorrect wording detection system to which the present invention is applied.

FIG. 3 shows an exemplary configuration for an incorrect wording detection system 20 to which the present invention is applied. The incorrect wording detection system 20 comprises a pair generating unit 21, a pair management unit 22, a positive/negative determining unit 23, and a positive example database 24.

The pair generating unit 21 generates pairs (a, b) of binomial relationships, from individual characters constituting input x to be subjected to a grammar check, for preceding character strings and following character strings connecting between each of the characters. The pair management unit 22 determines whether the pair (a, b) the input unknown example x exists in the correct data D, and the likelihood $Q(x)$ of the pair (a,b) of the input x being an negative example is calculated by the positive/negative determining unit 23. The positive/negative determining unit 23 performs the same processing as the negative example prediction processing system 10 shown in FIG. 1 and calculates the likelihood of the pair (a,b) of the input x received the pair management unit 22 to be a negative example.

The positive/negative determining unit 23 comprises an existence determination unit 231 performing the same processing as the existence determination unit 11 shown in FIG. 1 for determining whether or not the pair (a,b) of the input x generated by the pair generating unit 21 exists in the positive example data D, an appearance probability estimation unit 232 using the same processing as the appearance probability estimation unit 12 to calculate a typical probability of appearance $p(x)$ for the pair (a,b) of the input x, and a negative example likelihood calculation unit 233 using the same processing as the negative example likelihood calculation unit 13 to calculate a likelihood $Q(x)$ of the pair (a,b) of the input x to be a negative example. The positive example database 24 stores the positive example data D used for processing, representing a corpus constituted by a collection of correct Japanese sentences.

In this method, the binomial relationship (a, b) for the input x constituting the processing subject is taken to be a relationship for two character strings of an arbitrarily continuing 1 to 5 gram between each space. The basic way of thinking is that wording errors are detected by carrying out a concatenation check on the two character strings a, b using the positive example database (corpus) 24. When the two character strings a and b can be linked "this is a positive example", and when the character strings cannot be linked "this is a negative example".

Figure 4:
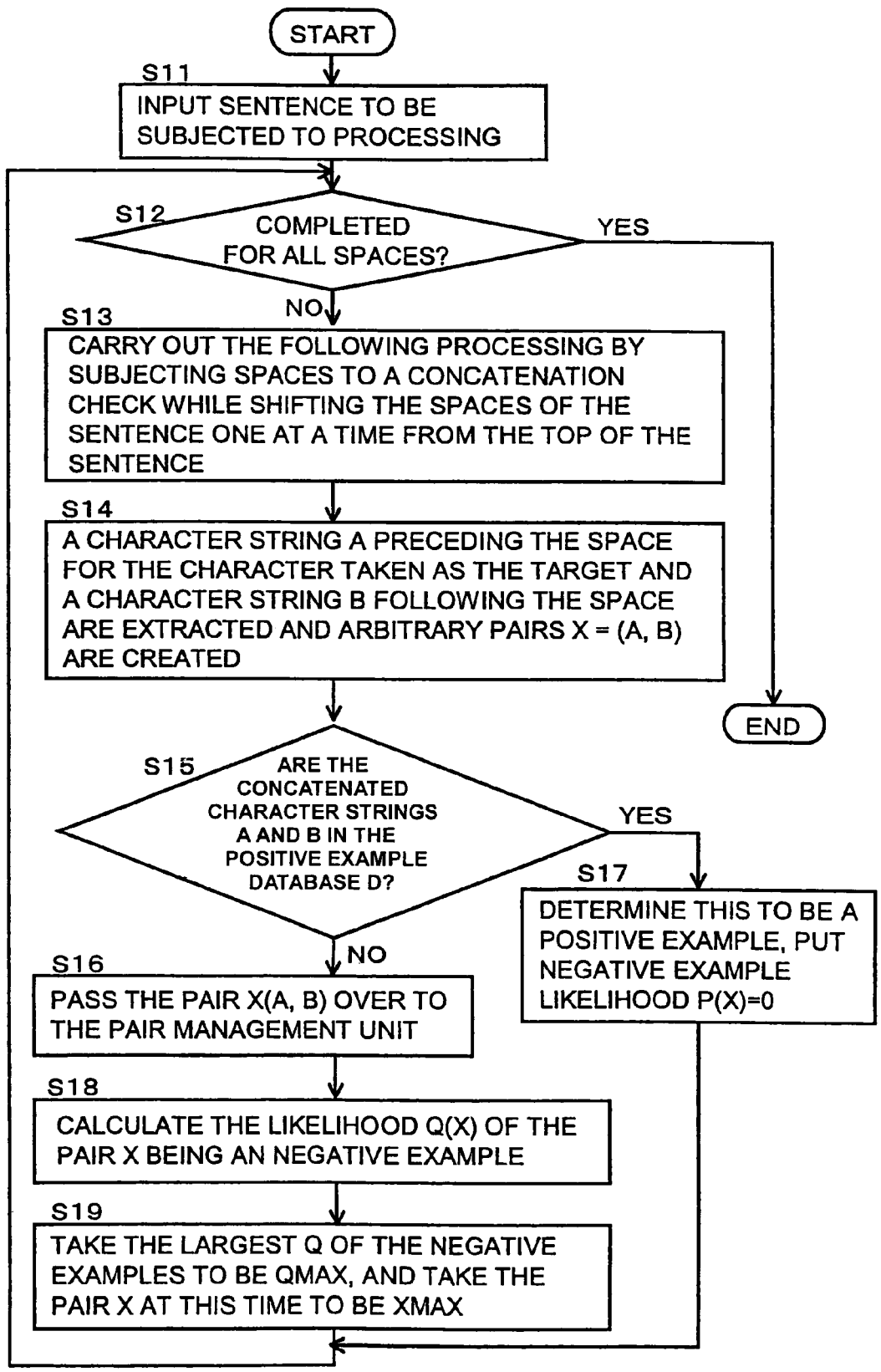
FIG. 4 is a flowchart of a process for detecting incorrect wording.

FIG. 4 shows a flow for a process for wording error detection processing occurring in this method.

The pair generating unit 21 of the incorrect wording detection system 20 inputs the passage (i.e., sentence) to be subjected to processing (step S11). When processing is performed for each of the gaps or spaces until it is completed for all the gaps or spaces (step S12), the steps S14 to S19 are performed taking each space as the subject of a concatenation check while shifting the spaces between the characters one at a time from the top of the sentence (step S13). The pair generating unit 21 extracts a preceding 1 to 5 gram character string a, and the following 1 to 5 character string b from the spaces in the subject character string. Here, twenty five pairs are generated (step S14). A check is then made as to whether or not the twenty five articulations ab for the input x are in the positive example database 24 using the existence determination unit 231 and the results of this determination are returned to the pair generating unit 21 (step S15). Upon receiving determination results from the existence determination unit 231, the pair generating unit 21 transfers the concatenations ab for the input x that do not exist in the corpus 24 to the pair management unit 22 (step S16). When the pair generating unit 21 received a determination from the existence determination unit 231 to the effect that all of the pairs are in the corpus 24, this space is determined to be articulated, the articulation is determined to be appropriate (a positive example), and the negative example likelihood Q(x) is taken to be zero (step S17), and the process moves on to the next space (step S13).

At the pair management unit 22, pairs received from the pair generating unit 21 are passed over to the positive/negative determining unit 23, and the appearance probability estimation unit 232 of the positive/negative determining unit 23 obtains the negative example likelihood Q(x) for each pair in the above described manner (step S18). When the value of Q(x) is highest, the pair management unit 22 takes the value of Q(x) to be Qmax and takes x to be xmax, with spaces for which the Q(xmax) value is larger being determined to have a higher likelihood to be inappropriate for concatenation. The process then moves on to the next space (step S19). In the above process, twenty five types of binomial relationship are made at each location (space), for which respective negative example likelihoods Q(x) are obtained, with the value Q(xmax) for when Q(x) is large being used in the final determination. In other words, twenty five types are prepared as a pattern for the concatenation check, from which the pattern with the largest likelihood of being an negative example is utilized in a final evaluation. Typically, an appropriateness check is a check performed using various check mechanisms, with a determination of inappropriateness being made when there is a detection of inappropriateness made by at least one of these check mechanisms. In the present invention, similar to the case of this appropriateness check, a large number of check patterns are prepared, from which the largest value when the checks are made is used as the final evaluation.

The data checked for errors can also be added to the positive example data D. When the data checked for errors was added to the positive example data D, expressions to be checked are detected more than once because the data itself is used. The use of an appearance frequency with one subtracted is therefore adopted. This is equivalent to the "leave one out" method. However, in this case, there is the problem that an error may not be detected when exactly the same error appears two times or more over all of the data for the positive example data D, and this situation should be considered when using the detection results.

A specific example is described in order to demonstrate the effectiveness of the present invention.

First, a trial is performed to see whether or not the negative example shown in the related method (hereinafter referred to as related method C) disclosed in cited reference 3 is detected. FIG. 5 shows nine examples including errors shown in cited reference 3. The underlined portions of the examples are the incorrect portions. Data for passages in the M Newspaper from 1991 to 1998 are used as the positive example data D.

FIG. 6 shows the examples with the ten highest ranked likelihoods of being negative examples of the results of the incorrect wording detection process of the present invention. In FIG. 6, it can be understood that negative likelihoods are extremely high for the upper ranks, and are substantially close to the upper limit of 1. Further, it can be understood that everything other than "imi network"(「意味ネットワーク」) in example sentence 8 is extracted and successfully subjected to incorrect wording detection. In the examples shown in FIG. 5, example 1 is "shizenna (tsunagari ga motsu you ni suru) hitsuhyou ga aru"(「自然な(つながりが もつようにする 必要がある) 必要がある。」). All of the examples with the exception of the one example "displaying of erroneous portions shown by underlined portions in FIG. 5" can therefore be detected within the upper ranked 25 items.

In related art C where all of the series of hiragana of the corpus are listed in a dictionary, and series of hiragana that are not in the corpus are taken to be negative example sentence 8 and example sentence 9 cannot be detected. However, according to the present invention, the errors in example 8 and example 9 can be detected at upper ranks.

A trial was also carried out under the same conditions for related art A for purposes of comparison. In related art A, candidates for errors are detected at eleven locations. However, only three examples are correctly detected and consideration is also to be given to recall rate.

Next, a description is given of a further analogous specific example using data generated deliberately with errors.

This example was carried out using approximately 20,000 words (892,655 characters) for the sixteen days up to Jan. 17, 1995 of the M Newspaper in the Kyoto University corpus. The Kyoto University corpus is described in the following cited reference 11.

[Cited reference 11: 黒橋禎夫 他, 京都大学テキスト・コーパス・プロジェクト, 言語処理学会第3回年次大会(Sadao Kurohashi et. al., Kyoto University Text Corpus Project, Third Annual Conference of the Language Processing Society, pp. 115-118, (1997))

In this example, processing is carried out independently for three types of mock examples of errors of deleting one character, replacing one character, and inserting one character. One hundred errors are then generated at random locations for each day for the three types of examples so that a total of 1,600 errors are made. At this time, the condition was provided that other errors do not appear within ten characters to either side of the location of each error. The characters newly provided at the time of replacement and insertion are decided randomly under conditions proportional to appearance frequency distribution of characters in data of the Kyoto University corpus for the years from 1991 to 1994.

The number of errors made is 1,600 characters and the original number of characters is 892,655, giving an erroneous character appearance rate of 0.18%, meaning that one error occurs every 558 characters. Example data for the years 1991 to 1994 of the M newspaper is used as the positive example data D. The examples to be processed are inputted with data for one day making up one example (data). Namely, own data of the method carried out using data including own data described above is therefore this one day portion of data.

Processing of related art A is also carried out in addition to the processing of the present invention for comparison. FIG. 7 to FIG. 9 show the results of this processing. FIG. 7 shows precision of error detection for data where one character is deleted. FIG. 8 shows precision of error detection for data where one character is replaced.

FIG. 9 shows precision of error detection for data where one character is inserted. Here, recall rate and relevance rate are used in evaluation. The recall rate refers to the number of correct answers divided by the total number of errors of 1,600, and the relevance rate refers to the number of correct answers divided by the number of detections. In FIG. 7 to FIG. 9, "upper rank number X" refers to the detection precision for X number of upper ranked items of data sorted according to incorrect likelihood Q(x).

Further, determination of a correct detection can be achieved even if indication is made to one character shifted to the front or rear of one erroneous character without precisely indicating the erroneous character. Moreover, one character to the front or rear of an example, which has already been determined to be positive/negative, is removed from the determination from thereon when the indication of this example is that it is not correct.

The following can be understood from the precision of the detection shown in FIG. 7 to FIG. 9.

In FIG. 7 to FIG. 9, the recall rate increases as X of the upper rank number X increases, i.e. as the detection number increases. The recall rate and the relevance rate coincide when looking at the upper rank 1,600 items. This is because the number of total errors and the number of detections coincide. When checking at this time, it can be understood that the precision using data with single characters deleted is ⅓ (refer to FIG. 7), and the precision with data with single characters replaced/inserted is ½ (refer to FIG. 8 and FIG. 9). With the mock data of this example, errors occur at a rate of one every 558 characters. This means that one error occurs every one and a half pages of a 400 character per page manuscript, with approximately ⅓ of single character deletions at a probability of ⅓ being detected, and approximately half of single character replacements and insertions at a probability of a half being detected. Typically, when the probability of appearance of errors is reduced, where errors are indicated that are not errors occur, and precision therefore falls. The appearance of errors is extremely small compared to the appearance of correct characters. Therefore, typically, when the probability of the appearance of errors simply becomes half, it can be considered that the problematic portions detected as errors are doubled so that precision is halved.

Next, the present invention and related art A are compared. As shown in FIG. 7 to FIG. 9, the extent of the errors cannot be put into numerical form in related art A. There is therefore no standard (value) to take as a reference when sorting during detection, and it is not possible to just extract upper ranks according the detection results for checking.

The present invention is, however, capable of calculating likelihood of negative examples as numerical values so that the extent of the detected errors can be put into numerical form and utilized. Therefore, in the present invention, results can be sorted based on the likelihood of positive examples and just precisely detected upper ranks can be extracted, which makes post processing possible.

Post processing may then take the form of displaying locations for which the detected likelihood of a negative example is large, i.e. locations for which the extent of incorrect wording is substantial, on a display device, so that straightforward revision of clear errors may be performed manually in a rapid manner. The displaying of incorrectly worded locations may then be performed in a manner differing from other portions by displaying divided up into colors, dividing up into brightness, of by causing portions to flash or the like, based on pre-decided classifications that are based on the likelihood of an example being incorrect, or the displaying of degrees of incorrect wording may be performed using graphs, etc.

Further, in related method A, the recall rate is fixed at 25% for single character deletions and 60% for other items. This presents the problem that a large number of errors are always overlooked. Further, with regards to basic precision, comparing the detection number with an approximate 5000 upper ranks where the detection number is similar, the present invention obtains results of a higher precision. Namely, with the incorrect wording detection of the present invention, it can be understood that the highest practical level of precision can be obtained.

In this method a description is given of processing taking Japanese as the processing target but the present invention can also be applied to grammatical error checking or the like occurring in other languages, such as in English.

Next, in another embodiment of the present invention, a description is given of processing in the case of applying the present invention to problems in the extraction of sentences having a non-case relational relative clause.

Figure 10:
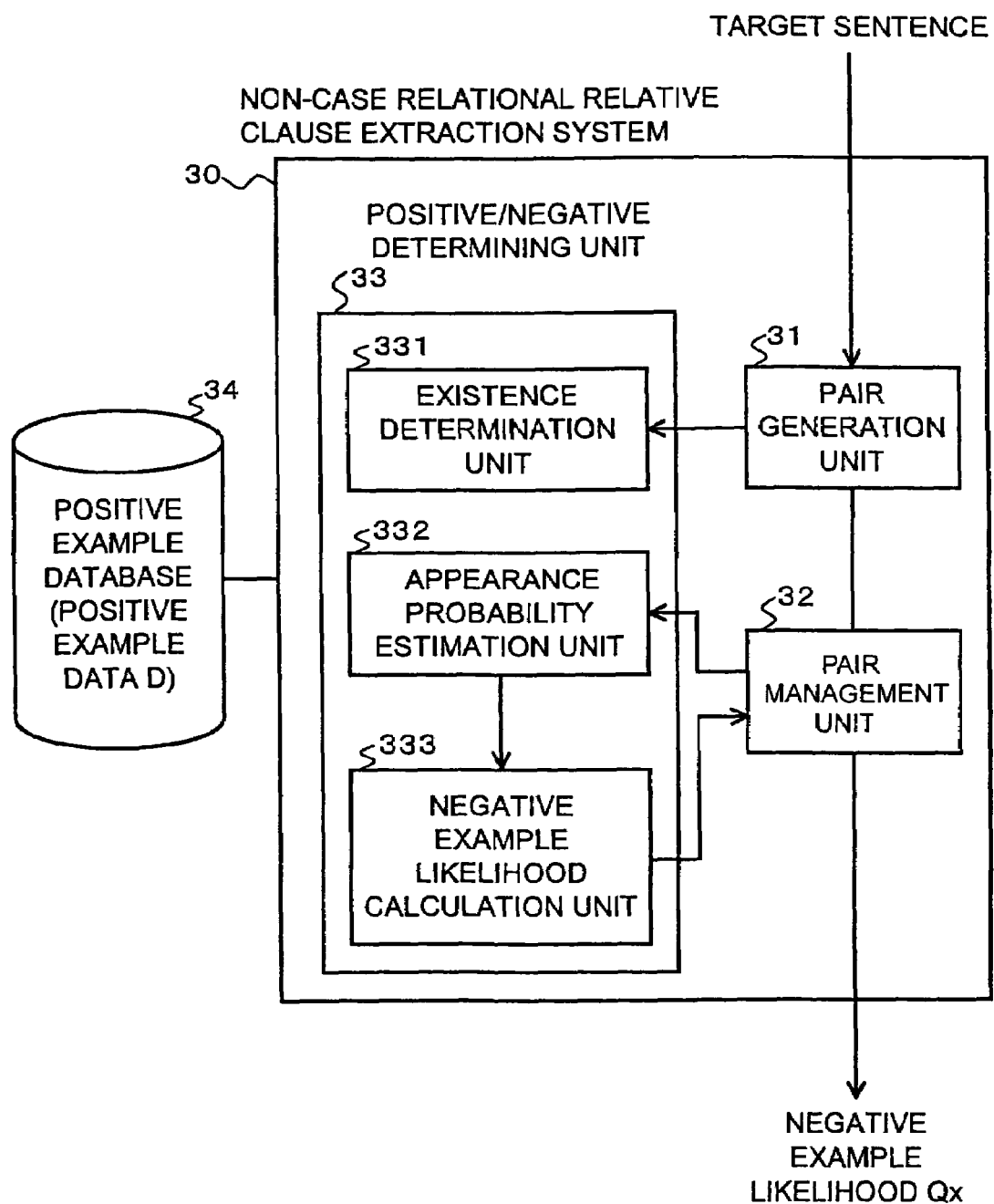
FIG. 10 is a block diagram showing an exemplary configuration of a sentence extraction system for a sentence having a non-case relational relative clause to which the present invention was applied.

FIG. 10 shows an exemplary configuration of a non-case relational relative clause extraction system 30 of this embodiment to which the present invention is applied. The non-case relational relative clause extraction system 30 has the same configuration as the incorrect wording detection system 20 shown in FIG. 3, with a pair generating unit 31, pair management unit 32 and a positive/negative determining unit 33 carrying out the same processing as the pair generating unit 21, pair management unit 22 and positive/negative determining unit 23 of the incorrect wording detection system 20.

A positive example database 34 is a database for storing data for pairs of nouns and verbs constituting case relationships extracted from a corpus constituted by a collection of correct Japanese sentences using a syntax analysis system (such as knp) as positive example data D. knp is described in the following cited reference 12.

[Cited reference 12: 黒橋禎夫, 日本語構文解析システムＫＮＰ使用説明書(Sadao Kurohashi, Specification Employing Japanese Language Structure Analysis System KNP), ver.2.0b6.]

In the non-case relational relative clause extraction system 30, binomial relationships (a, b) for processing targets x are taken as pairs of nouns and verbs. If a processing target x does not exist in the positive example data D, the processing target x is determined to be a non-case relational relative clause by the non-case relational relative clause extraction system 30 regardless of whether the processing target x is a pair of a noun and a verb that appears with a high frequency.

The flow of the processing in this non-case relational relative clause extraction process is substantially the same as the flow of the processing shown in the process flowchart for the incorrect wording detection process of FIG. 4.

First, a large volume of sets y of nouns and verbs constituting case relationships are extracted from the corpus using knp or the like, and the sets y are stored in the positive example database 34 as the positive example data D.

The pair generating unit 31 of the non-case relational relative clause extraction system 30 first extracts sets x=(a, b) for a large number of verbs of embedded clauses and their preceding relative nouns from the corpus or the like using knp, for example. This is a determination as to whether or not these items of data are non-case relational relative clauses.

An existence determination unit 331 of the positive/negative determining unit 33 determines whether or not the sets x=(a, b) generated by the pair generating unit 31 are included in the collection of sets y, i.e. in the positive example data D.

When a set x is included in the positive example data D, the existence determination unit 331 determines the set x to be a positive example, and the pair generating unit 31 determines the set x to be a case relational relative clause (positive example) rather than a non-case relational relative clause (negative example).

On the other hand, when the set x is not included in the positive example data D (collection of sets y), the set x can be considered to be a binomial relationship for a noun and a verb. This set x is then passed over to the pair management unit 32. The pair management unit 32 then hands the set x over to the positive/negative determining unit 33 and the acquisition of an negative example likelihood Q(x) for the set x is managed.

An appearance probability estimation unit 332 and a negative example likelihood calculation unit 333 of the positive/negative determining unit 33 calculate the negative example likelihood Q(x) for the set x using the processing described above. The larger the value of the negative example likelihood Q(x), the more likely the pair management unit 32 is to determine the negative example likelihood to be large, and that the possibility of a non-case relational relative clause is high.

A specific example is described in order to demonstrate the effectiveness of the present invention.

This example is carried out using data (870 examples) of the small volume of data (1,530 items) that affect embedded clauses. Precision can be obtained automatically because the data used contains information as to whether or not each example is a non-case relational relative clause. Of the data used, there are 267 examples that are non-case relational relative clauses. Example data of the M Newspaper for the seven years from 1991 to 1998 with the exception of 1995 is used as the positive example database 34.

The precision of detection in this example is shown in FIG. 11. Evaluation is carried out using recall rate, relevance rate and correctness rate. The recall rate refers to the number of items correctly specified as non-case relational relative clauses divided by the total number 267 of non-case relational relative clauses, and the relevance rate refers to the number of correctly specified non-case relational relative clauses divided by the detected number. The correctness rate is the correctness precision of differentiation for examples outside and inside the total number 870, for cases where the examples set up to that correctness point are determined to be non-case relational relative clauses.

In FIG. 11, "upper rank number X" refers to the detection precision for X number of upper ranked items of data sorted according to negative example likelihood Q(x). The detection precision in this example is 100% for up to the ten uppermost ranked items, and it can be understood that the number of sentences having non-case relational relative clauses can be extracted accordingly even with just positive examples. It can therefore be said that typically precision is low overall, but that relevance rate is high for upper ranks. The probability of appearance of a non-case relational relative clause is 30.7%, and in this example, regarding the situation where ten upper ranked items are corrected consecutively, the probability of items of a probability of 30.7% appearing ten times consecutively is 0.0000074, and therefore this cannot be said to be a natural occurrence. The height of the upper ranking relevance rate can also be considered to be such that an extraction of sentences having non-case relational relative clauses by the present invention can be considered to acquire practical accuracy.

When the present invention is applied to the problem of detecting incorrect wording in Japanese and the problem of extracting sentences having non-case relational relative clauses, in the case of either problem, negative examples can be detected using a high relevance rate for upper ranked results sorted according to likelihood of appearance of negative examples, and the validity of the present invention can be confirmed. The flexibility of the present invention can also be confirmed by demonstrating the effectiveness with which these two problems are dealt with. Namely, the present invention is effective by resolving problems in predicting negative examples from a large number of positive examples, and can be considered to similarly resolve these problems.

In the embodiments of the present invention, a description is given of processing for detecting incorrectly worded Japanese in incorrect wording detection processing employing machine learning techniques taking positive examples and negative examples as supervised data that uses concatenation.

Figure 12:
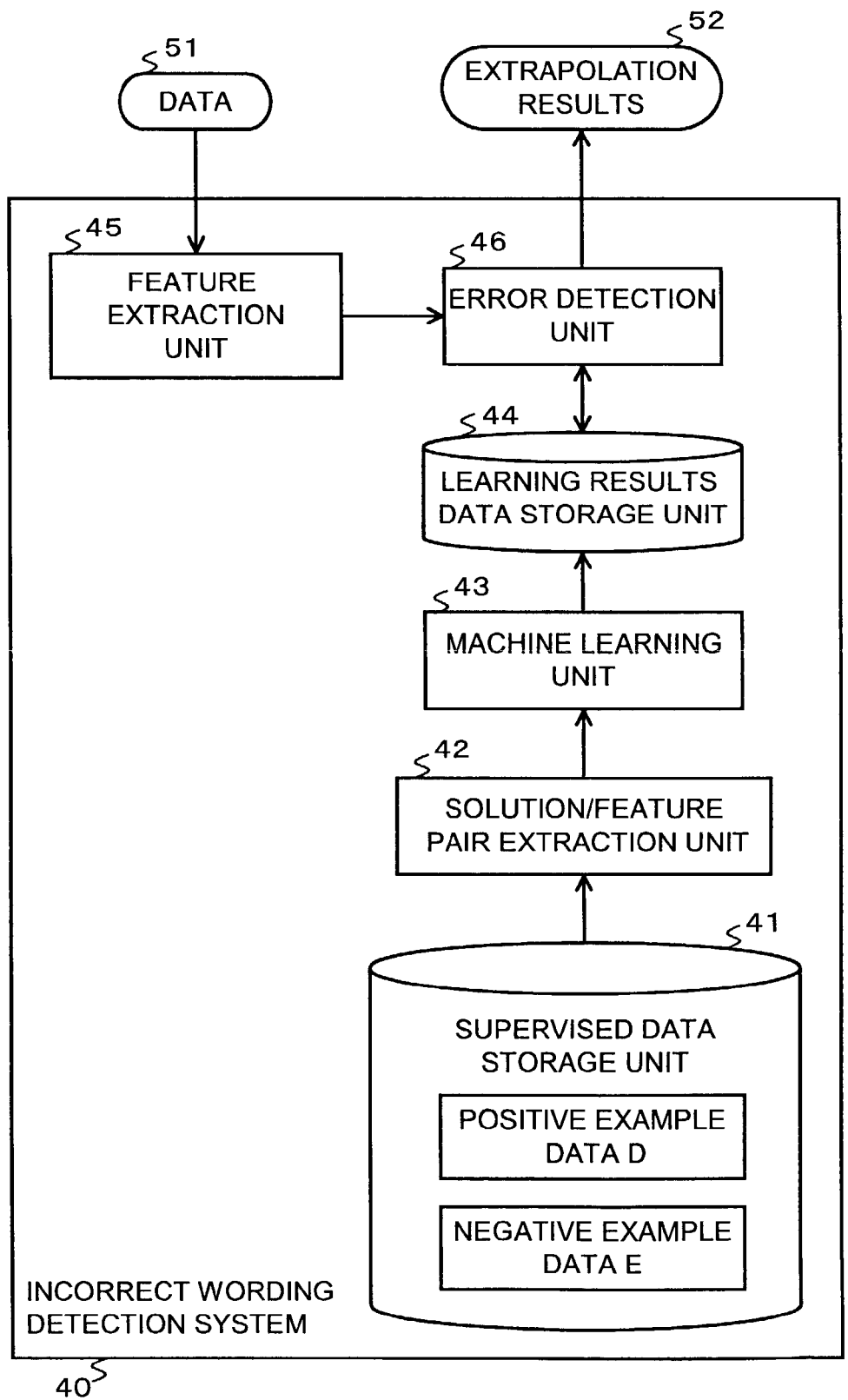
FIG. 12 is a block diagram of an exemplary configuration of an incorrect wording detection system according to an embodiment of the present invention.

FIG. 12 shows an exemplary configuration of an incorrect wording detection device 40 employing machine learning to which the present invention is applied.

The incorrect wording detection system 40 comprises a supervised data storage unit 41, a solution/feature pair extraction unit 42, a machine learning unit 43, a learning results data storage unit 44, a feature extraction unit 45, and an error detection unit 46.

The supervised data storage unit 41 stores data (supervised data) constituting supervised data during implementation of the machine learning. Correctly worded examples (positive examples) and incorrectly worded examples (negative examples) are stored in the supervised data storage unit 41 as supervised data. A corpus or the like constituted by a collection of correct sentences, for example, may also be utilized as these positive examples. Data with incorrect wording typically does not exist, so data generated manually in advance is used as these negative examples. Further, it is also possible to generate these negative examples from positive examples using the negative example prediction processing method described in the following. The solution/feature pair extraction unit 42 extracts groups from sets of solutions and features for each example of supervised data stored in the supervised data storage unit 41. The machine learning unit 43 uses machine learning techniques to determine what kind of solution is found in the shortest time and what kind of feature from the groups of sets of solutions extracted by the solution/feature pair extraction unit 42 to use. The results of this learning are then stored in the learning results data storage unit 44.

The feature extraction unit 45 extracts a collection of features from the data 51 constituting the incorrect wording detection target, and transmits the extracted collection of features to the error detection unit 46. The error detection unit 46 uses the learning results data of the learning results data storage unit 44 and extrapolating results for which a solution is straightforward (i.e., extrapolating whether or not there are wording errors), when sets of features are received the feature extraction unit 45, and outputs extrapolation results 52.

FIG. 13 shows an exemplary configuration of data in the supervised data storage unit 41. Supervised data constituted by sets of problems and solutions is stored in the supervised data storage unit 41. For example, spaces for each character of a sentence (expressed using <|>) are taken as problems, and supervised data corresponding to solutions (solution, error) for concatenation of this space are stored. Of the assisted data in FIG. 13, "problem-solution:

setsumei shita houhou de <|> wo mochiiru koto ga dekiru—negative(incorrect) (「問題-解: 説明した方法で<|>を用いることができる-誤り」)" is an example of negative example data E, and "problem-solution:

setsumei shita houhou <|> de wo mochiiru koto ga dekiru—positive (correct) (「問題-解: 説明した方法<｜>でを用いることができる-正」)" is an example of positive example data D.

Figure 14:
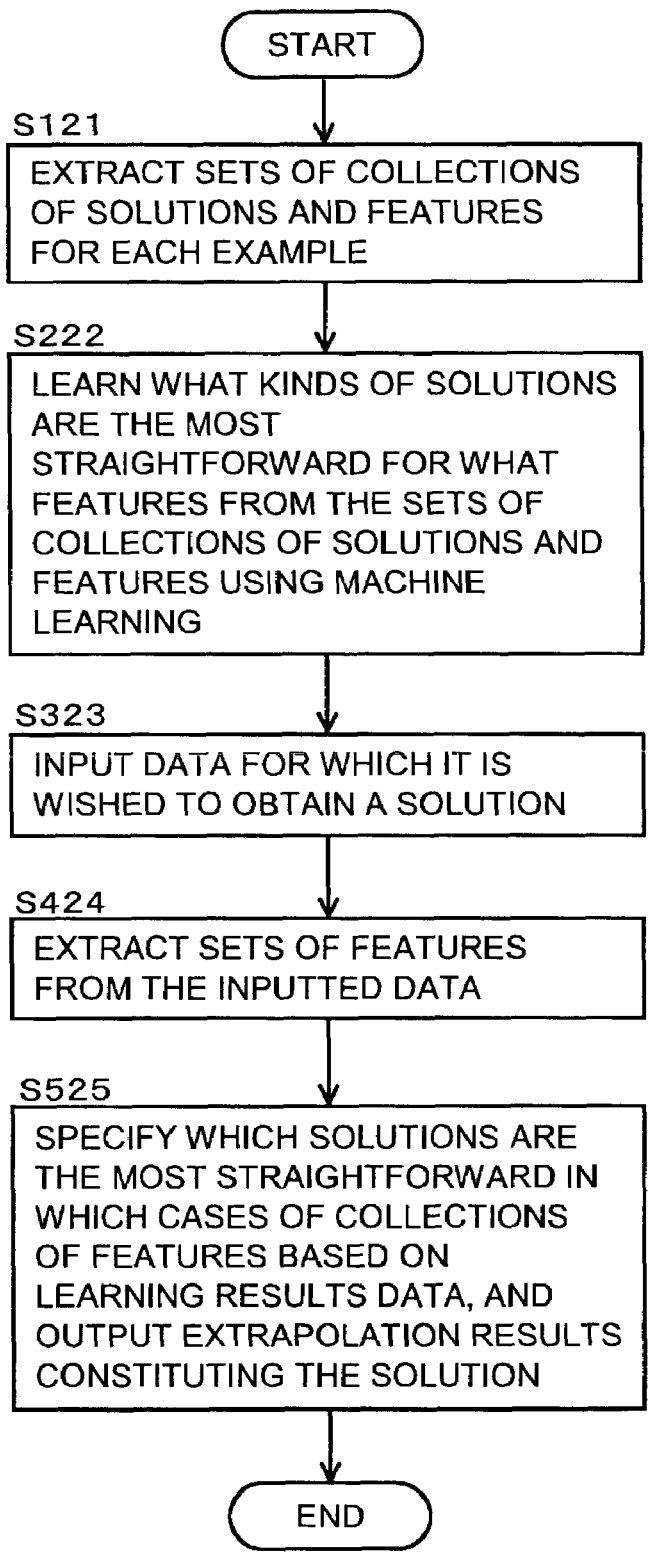
FIG. 14 is a flowchart of a process for detecting incorrect wording.

FIG. 14 shows a flow for a process for detecting incorrect wording. Positive example data D and negative example data E are stored in the supervised data storage unit 41 (see FIG. 12) prior to performing the incorrect wording detection processing.

First, the solution/feature extraction unit 42 extracts a group of a set of a solution and a feature from the supervised data storage unit 41 for each example (step S121). Here, "feature" means a single unit of detailed information used in analysis. Extraction of spacing of characters constituting determination targets of concatenation as features is as follows.

a) character strings of each 1 to 5 gram for previous terms and following terms, b) 1 to 5 gram character strings including a target (space) (where spaces (<|>) constituting targets are handled as single characters), c) words for previous terms and following terms (utilizing processing means that are not shown in FIG. 12 for carrying out existing morpheme analysis), and d) part of speech of word for previous terms and following terms.

For example, when the "problem-solution" is "setsumei shita houhou de <|> wo mochiiru koto ga dekiru—wrong" (「説明した方法で<｜>を用いることができる-誤り」)

the features shown in FIG. 15 are extracted. Namely, the following features are extracted.

feature: previous term "shita houhou de"(「した方法で」), previous term "ta houhou de"(「た方法で」), previous term "houhou de"(「方法で」), previous term "hou de"(「法で」), previous term "de"(「で」), following term "wo mochiiru ko"(「を用いるこ」), following term "wo mochiiru"(「を用いる」), following term "wo mochii"(「を用い」), following term "wo mochi"(「を用」), following term "wo"(「を」), "ta houhou de <|>"(「た方法で<｜>」), "houhou de <|> wo"(「方法で<｜>を.」), "hou de <|> wo mochi"(「法で<｜>を用」), "de <|> wo mochii"(「で<｜>を用い」), "<|> wo mochiiru"(「<｜>を用いる」), previous term "de"(「で」), following term "wo"(「を」), previous term "particle", following term "particle".

Next, the machine learning unit 43 machine (see FIG. 12) learns what kind of solution is found in the shortest time and what kind of feature from the groups of sets of solutions and features extracted by the solution/feature pair extraction unit 42 and stores these learning results in the learning results data storage unit 44 (step S222). For example, a decision list method, a maximum entropy method or a support vector machine method etc. may be used as the machine learning method.

Decision list techniques define groups consisting of features and classifications for storage in a list of a pre-decided order of priority. When input to be subjected to detection is then provided, the input data and the defined features are compared in order from the highest priority using the list. Defined classifications where elements match are then taken as the input classification.

In the maximum entropy technique, when a group of preset sets of features fj (1≦j≦k) are taken to be F, probability distribution p(a, b) for when an expression signifying entropy is a maximum while prescribed constraints are fulfilled is obtained, with classifications having larger probability values then being obtained for the probabilities for each classification obtained in accordance with this probability distribution. Support vector machine techniques are methods where data is classified from two classifications by dividing space up into a hyperplane. The determination list techniques and maximum entropy techniques are described in cited reference 13 in the following, and the support vector machine techniques are described in the following cited references 14 and 15.

[Cited Reference 13: 村田真樹, 内山将夫, 内元清貴, 馬青, 井佐原均, 種々の機械学習法を用いた多義解消実験 電子情報通信学会(Maki Muruta, Masao Uchiyama, Kiyotaka Uchimoto, Ma Sei and Hitoshi Isahara, Experiments on word sense disambiguation using several machine-learning methods, The Institute of Electronics, Information and Communication Engineers), NCL 2001-2,(2001)].

[Cited reference 14: Nello Cristianini and John Shawe-Taylor, An Introduction to Support Vector Machines and Other Kernel-based Learning Methods, Cambridge University Press, (2000).]

[Cited reference 15: Taku Kudoh, Tinysvm, Support Vector machines, (http://cl.aist-nara.acjp/taku-ku//software/TinySVM/index.html,2000)]

The machine learning unit 43 is not limited to the above procedure, and any method may be employed providing that these techniques are supervised machine learning techniques.

feature extraction unit 45 (see FIG. 12) takes the data 51 for which it is wished to obtain a solution as input (step S323, FIG. 14), sets of features are extracted from the data 51 (see FIG. 12) in substantially the same manner as the processing at the solution/feature pair extraction unit 42, and this is passed over to the error detection unit 46 (step S424, FIG. 14).

The error detection unit 46 (see FIG. 12) specifies what kinds of solutions are the most straightforward in the case of collecting passed over features based on the learning results in the learning results data storage unit 44 and outputs the specified solution, i.e. the extrapolation results 52 as to whether this is a specified solution, i.e. incorrectly worded or not (step S525, FIG. 14). For example, in the case of analysis of a problem regarding articulation of a space <|>, if the data 51 is "setsumei shita houhou de <|> wo mochiiru koto ga dekiru"(「説明した方法で<｜>を用いることができる」), extrapolation results 52 of "negative (incorrect)" are output.

Regarding the positive example data D for the supervised data storage unit 41 shown in FIG. 12, acquisition is relatively straightforward because a corpus or the like can be utilized. However, acquisition of negative example data E is not straightforward and has to be generated manually, with the work involved in this operation being substantial. Processing accuracy is improved for a large amount of supervised data and it is therefore preferable to prepare as much supervised data as possible.

Figure 16:
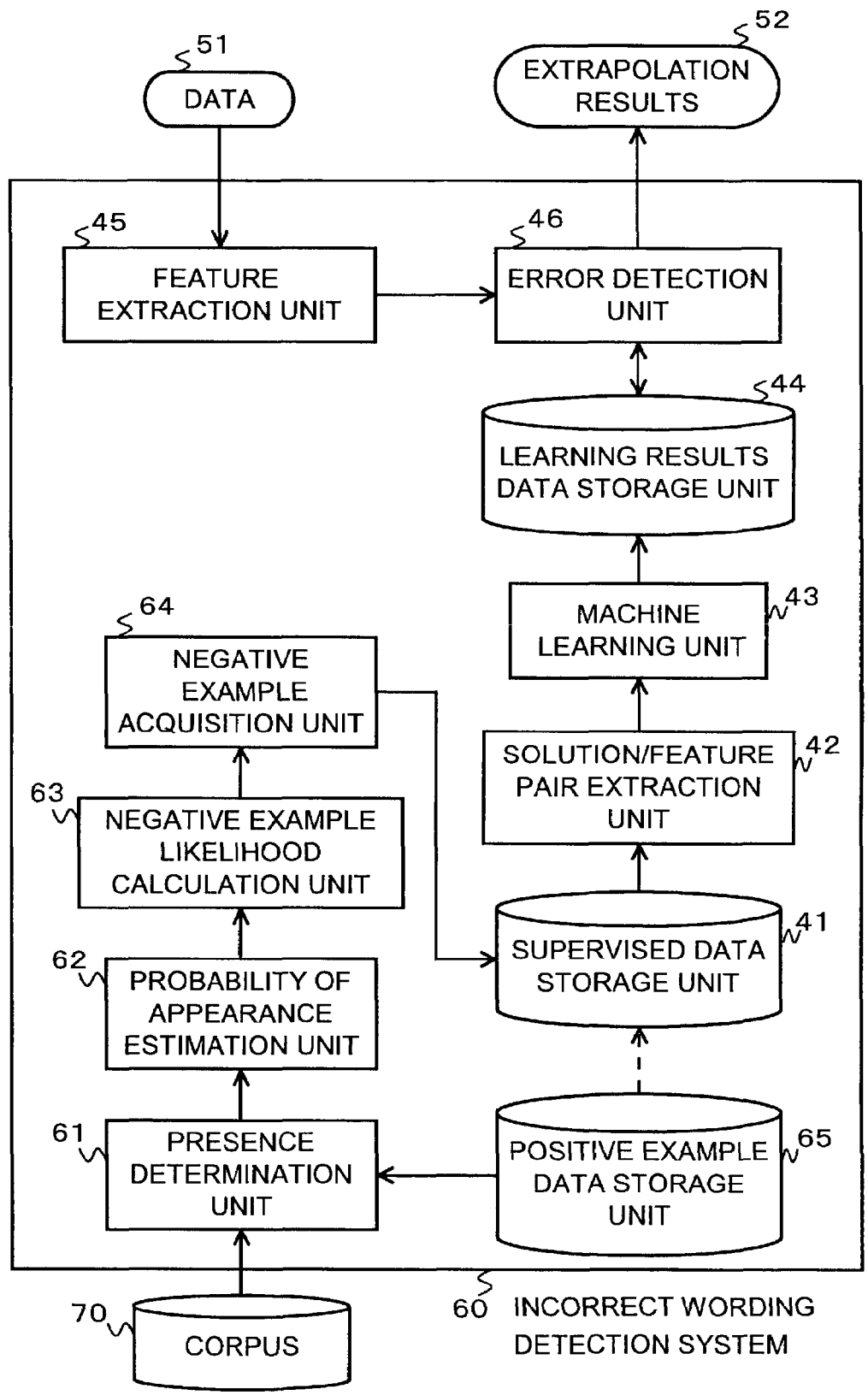
FIG. 16 is a block diagram representing an exemplary configuration of an incorrect wording detection system of another embodiment of the present invention.

FIG. 16 shows an exemplary configuration of an incorrect wording detection device 60 of another embodiment of the present invention. The incorrect wording detection system 60 reduces the amount of work involved in creating the negative example data E taken as the supervised data, the negative example data E is plentiful, and highly accurate incorrect wording detection can be implemented utilizing machine learning techniques provided with the supervised data.

The incorrect wording detection system 60 comprises a supervised data storage unit 41, a solution/feature pair extraction unit 42, a machine learning unit 43, a learning results data storage unit 44, a feature extraction unit 45, an error detection unit 46, a presence determination unit 61, a probability of appearance estimation unit 62, a negative example likelihood calculation unit 63, a negative example acquisition unit 64, and a positive example data storage unit 65.

The supervised data storage unit 41, the solution/feature pair extraction unit 42, the machine learning unit 43, the feature extraction unit 45, and the error detection unit 46 are the same as the corresponding elements of the incorrect wording detection system 40 described for the embodiment shown in FIG. 12, and a description thereof is therefore omitted.

The presence determination unit 61 determines whether or not examples x of a corpus 70 constituting a collection of Japanese sentences not provided with correct or incorrect information are positive example data D stored in the positive example data storage unit 65. The probability of appearance estimation unit 62 calculates a typical probability of appearance (frequency) p(x) for an example x when the example x does not exist in the positive example data storage unit 65. The negative example likelihood calculation unit 63 calculates a likelihood Q(x) of the example x to be a negative example based on the probability of appearance p(x). The negative example acquisition unit 64 stores the example x as a negative example E when the negative example likelihood Q(x) received from the negative example likelihood calculation unit 63 exceeds a prescribed value and the example x is then stored in the supervised data (negative example data E) storage unit 41 as supervised data for a concept for a problem-solution.

Figure 17:
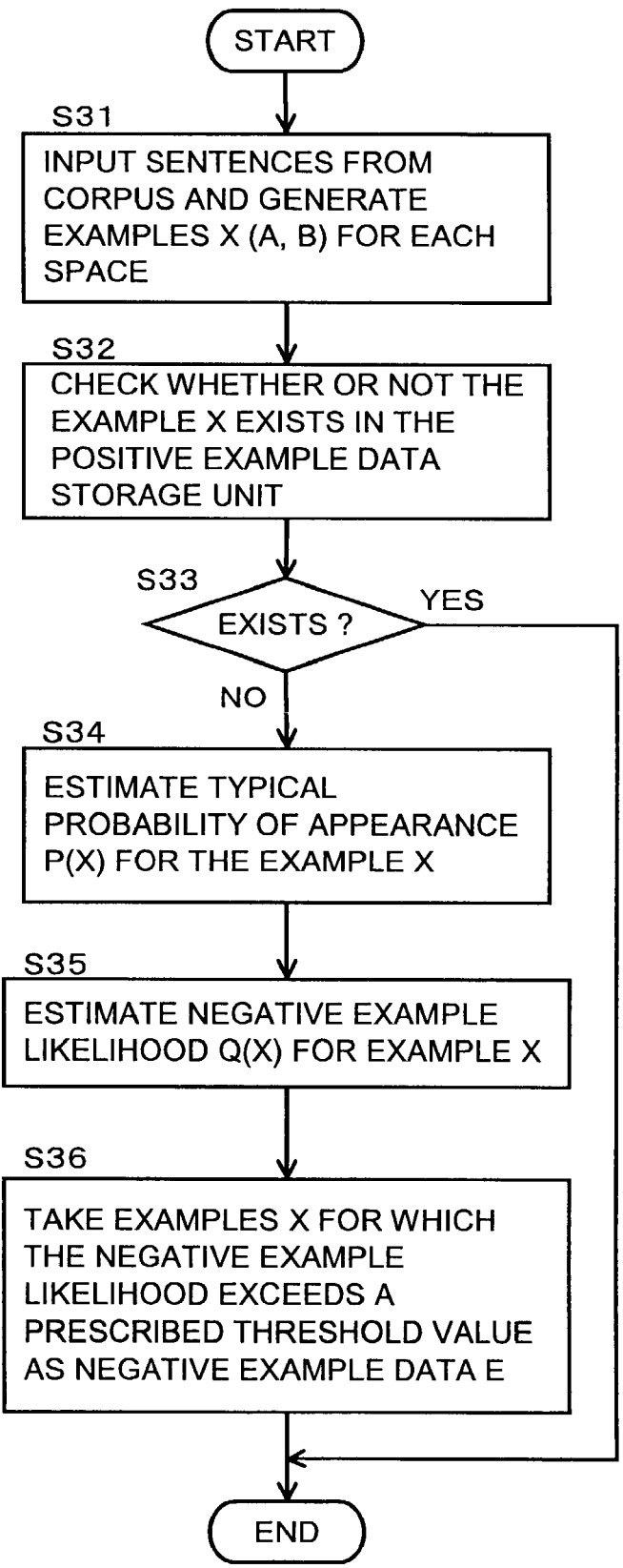
FIG. 17 is a flowchart of a process for acquiring data for negative examples.

FIG. 17 shows a flow for the process for acquiring the negative example data E constituting the supervised data occurring at the incorrect wording detection system 60. The presence determination unit 61 of the incorrect wording detection system 60 takes sentences which are not as yet known to be correct or incorrect as input from the corpus 70, takes each space as the subject of a concatenation check while shifting the spaces of the characters one at a time from the top of the sentence, reads out a character string a for the 1 to 5 gram preceding the space and a character string b for the 1 to 5 gram following the space, and generates arbitrary pairs of examples x=(a, b) (step S31). Here, twenty five examples (pairs) are made.

A check is then made as to whether or not the 25 concatenations ab for the example x are in the positive example data storage unit 65 (step S32), and if a concatenation ab exists in the positive example data storage unit 65, this example x is passed over to the probability of appearance estimation unit 62 (step S33).

The probability of appearance estimation unit 62 estimates a typical probability of appearance p(x) for an example x (step S34). For example, positive example data D of the positive example data storage unit 65 is comprised of the binomial relationship (a, b), and assuming that the binomials a and b are mutually independent, a probability of appearance p(x) for a binomial relationship (a, b) is taken to be the product p(a)×p(b) when the probability of appearance for a and b of the positive example data storage unit 65. Namely, a typical probability of appearance p(x) is calculated using the probabilities of each of the terms a and b by taking each example to be a binomial relationship (a, b) and assuming each term a and b to be independent.

The negative example likelihood calculation unit 63 uses the probability of appearance p(x) of the example x to obtain a probability Q(x) of the appearance of the example x in the positive example data storage unit 65 (step S35). At this time, assuming that there are n items of positive example data D of the positive example data storage unit 65 that are independent of each other, one test is made with the probability that the example does not appear taken to be 1−p(x). When this then occurs n consecutive times, the probability that the example x does not appear in the positive example data D is (1−p(x))n, and probability that the example x appears in the positive example data D of the positive example data storage unit 65 becomes Q(x)=1−(1−p(x))n. Here, "a small probability Q(x)" refers to when, stochastically, the probability of the example x appearing in the positive example data D of the positive example data storage unit 65 is low, and means that it is ensured that stochastically, x does not appear because the positive example data (corpus) is small, which means that "it is possible that x is a positive example".

Conversely, "large probability Q(x)" means that, stochastically, the probability of the example x appearing in the positive example data D is high and that, stochastically, x will naturally appear in the same corpus, so that actual non-appearance of x in the corpus would mean that an inconsistency had occurred. This inconsistency runs contrary to the typical probability of appearance p(x) and to various independent assumptions. Here, when it is assumed anew that "when the example is a positive example, the typical probability of appearance p(x) and the various independent assumptions are correct", it is derived from this inconsistency that "it is not possible that example x is a positive example". In other words, "the probability Q(x) of the example x appearing in the positive example data D" means "the probability Q(x) that the example x is not a positive example". This means that Q(x) means a likelihood of an example being incorrect. Q(x) is therefore taken to be "the likelihood of an negative example", with a large Q(x) for example x giving a large likelihood that the example x is an negative example.

The negative example acquisition unit 64 takes the value when Q(x) is a maximum as Qmax, and takes x at this time as xmax, with spaces for which the value for Q(xmax) is large being taken to have a higher possibility of being concatenations, so that when the value of Q(xmax) is larger than a prescribed value, this spacing is stored in the supervised data storage unit 41 as negative example data E (step S36). The negative example data E and the likelihood Q(xmax) for this negative example may also be stored in the supervised data storage unit 41. The negative example data E can therefore by acquired using the frequency information for the positive example data D of the positive example data storage unit 65 by carrying out the processing in step S31 to step S35 on all of the spaces of the sentence, and the positive example data D and the negative example data E may then be prepared in the supervised data storage unit 41 as supervised data.

The processing thereafter is the same as for the error detection processing for the incorrect wording detection device 40 shown in FIG. 12 and description thereof is therefore omitted.

In the above, a description is given of practical implementations of the present invention but various modifications are possible within the scope of the present invention. For example, the probability of appearance estimation unit 62 of the incorrect wording detection system 60 shown in FIG. 16 may calculate the probability of appearance p(x) of the example x by any appropriate method and the method described in the embodiments of the present invention is by no means limited in this respect.

The positive example data D stored in the positive example data storage unit 65 can be used as the positive example data D for the supervised data storage unit 41 or separately prepared positive example data can also be employed.

The program implementing each of the means, functions or elements of the present invention may be stored on an appropriate recording medium readable by computer such as portable memory media, semiconductor memory, or a hard disc, etc., and may be provided through recording on such a recording media, or through exchange utilizing various communications networks via a communications interface.

What is claimed is:

1. A computer readable medium storing an executable code to perform on a computer a method of determining whether input data is correct, the method comprising:

storing a positive example data group D, including a number n of positive examples, wherein a positive example is known to be a correct example;

selecting example data x from the input data, which example data x consists of two independent parts a and b;

determining whether the example data x is stored in the positive example data group D;

calculating probabilities P(a) and P(b) based on appearance of part a and of part b of the example data x, respectively, in the positive example data group D, when the example data x is not stored in the positive example data group D, and determining a first probability $P(x)=P(a)\cdot P(b)$ that the example data x should be stored as a positive example in the positive example data group D; and estimating a likelihood that the example data x is a negative example, any negative example being purposefully excluded from the positive example data group D, by calculating a second probability $Q(x)$ using the first probability $P(x)$, wherein $Q(x)=1-(1-P(x))^n$ the second probability representing likelihood that the example data x should be stored as any one of n positive examples in the positive example data group D when the example data x is not currently stored as a positive example;

determining the example data x is a negative example, if the second probability is larger than a predetermined value and the example data x is not currently stored as a positive example, and outputting the example data x if the determining indicated that the example data x is a negative example.

2. The computer readable medium storing an executable code to perform on a computer a method of determining whether input data is correct according to claim 1, the method further comprising:

arranging a plurality of example data x from the input data in a descending or an ascending order based on their respective second probability; and outputting the plurality of example data x not present in the positive example data group D in the descending or the ascending order generated in the arranging of the plurality of example data x.

3. The computer readable medium storing an executable code to perform on a computer a method of determining whether input data is correct according to claim 1, further comprising: displaying the input data wherein a plurality of example data are displayed with a changed color or brightness or displaying under different displaying conditions according to an ascending or a descending order based on their respective second probability.

4. The computer readable medium storing an executable code to perform on a computer a method of determining whether input data is correct according to claim 1, wherein the outputting outputs the likelihood that the example data x is a negative example together with the example data x output as a negative example.

5. A computer executable method of determining whether input data is correct, performed on a computer the method comprising:

storing a positive example data group D, including a number n of positive examples, wherein a positive example is known to be a correct example, in the computer;

selecting example data x from the input data, which example data x consists of two independent parts a and b;

determining whether the example data x is stored in the positive example data group D;

calculating probabilities $P(a)$ and $P(b)$ based on appearance of part a and of part b of the example data x, respectively, in the positive example data group D, when the example data x is not stored in the positive example data group D, and determining a first probability $P(x)=P(a)\cdot P(b)$ that the example data x should be stored as a positive example in the positive example data group D; and estimating a likelihood that the example data x is a negative example, any negative example being purposefully excluded from the positive example data group D, by calculating a second probability $Q(x)$ using the first probability $P(x)$, wherein $Q(x)=1-(1-P(x))^n$ the second probability representing likelihood that the example data x should be stored as any one of n positive examples in the positive example data group D when the example data x is not currently stored as a positive example;

determining the example data x is a negative example, if the second probability is larger than a predetermined value and the example data x is not currently stored as a positive example, and displaying the example data x on the computer, if the determining indicated that the example data x is a negative example.

* * * * *